(12) United States Patent
Mosterman et al.

(10) Patent No.: US 8,359,304 B1
(45) Date of Patent: **\*Jan. 22, 2013**

(54) COLLABORATIVE MODELING ENVIRONMENT

(75) Inventors: Pieter J. Mosterman, Framingham, MA (US); Farid Antoine Abi-Zeid, Natick, MA (US); Hidayet Tunc Simsek, Newton, MA (US); Claudia Gaudagnini Wey, Wayland, MA (US); Mojdeh Shakeri, Southborough, MA (US); Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/185,243

(22) Filed: Jul. 18, 2011

Related U.S. Application Data

(63) Continuation of application No. 11/687,510, filed on Mar. 16, 2007, now Pat. No. 8,005,812.

(51) Int. Cl.
*G06F 7/00* (2006.01)
*G06F 17/30* (2006.01)

(52) U.S. Cl. ........ 707/706; 707/713; 707/723; 707/731; 707/749; 707/769

(58) Field of Classification Search .................. 707/708, 707/713, 723, 731, 749, 706
See application file for complete search history.

(56) References Cited

U.S. PATENT DOCUMENTS

| | | | |
|---|---|---|---|
| 4,862,376 A * | 8/1989 | Ferriter et al. ................. | 700/107 |
| 5,980,096 A * | 11/1999 | Thalhammer-Reyero ............ | 1/1 |
| 6,240,411 B1 | 5/2001 | Thearling | |
| 6,279,006 B1 | 8/2001 | Shigemi et al. | |
| 6,415,320 B1 | 7/2002 | Hess et al. | |
| 6,445,782 B1 | 9/2002 | Elfe et al. | |
| 6,658,393 B1 | 12/2003 | Basch et al. | |
| 6,961,688 B2 | 11/2005 | Bankes | |
| 7,272,618 B1 | 9/2007 | Bisotti et al. | |
| 7,373,317 B1 | 5/2008 | Kopelman et al. | |
| 7,451,065 B2 | 11/2008 | Pednault et al. | |
| 7,512,932 B2 | 3/2009 | Davidov et al. | |
| 7,542,892 B1 | 6/2009 | Clark et al. | |
| 7,788,123 B1 | 8/2010 | Ekhaus et al. | |
| 7,809,770 B2 | 10/2010 | Jain et al. | |
| 7,890,378 B2 | 2/2011 | Clarke et al. | |
| 8,005,812 B1 | 8/2011 | Mosterman et al. | |
| 2001/0013009 A1 | 8/2001 | Greening et al. | |
| 2002/0019971 A1 | 2/2002 | Zygmont et al. | |

(Continued)

OTHER PUBLICATIONS

3dexport.com, WebArchive.org archived site dated Dec. 10, 2005, http://web.archive.org/web/20051210033500/http://www.3dexport.com/, accessed on Jul. 22, 2010.*

(Continued)

*Primary Examiner* — Wilson Lee
*Assistant Examiner* — Mark Hershley
(74) *Attorney, Agent, or Firm* — Cesari and McKenna, LLP; Michael R. Reinemann

(57) ABSTRACT

A system may receive a model, extract information from the model, form a group of tags using the extracted information, and associate the group of tags with the model. The system may further receive a search query including one or more sequences of characters and determine whether to provide the model in a list of models created for the search query, based on the one or more sequences of characters and the group of tags.

15 Claims, 24 Drawing Sheets

U.S. PATENT DOCUMENTS

| | | | |
|---|---|---|---|
| 2002/0026390 A1 | | 2/2002 | Ulenas et al. |
| 2002/0123874 A1 | | 9/2002 | Roesner et al. |
| 2002/0143800 A1 | * | 10/2002 | Lindberg et al. .............. 707/201 |
| 2003/0036975 A1 | | 2/2003 | Martin et al. |
| 2003/0065663 A1 | | 4/2003 | Chu |
| 2003/0176931 A1 | * | 9/2003 | Pednault et al. ................ 700/31 |
| 2003/0187534 A1 | | 10/2003 | Suzuki et al. |
| 2003/0191618 A1 | | 10/2003 | Gabele et al. |
| 2003/0220911 A1 | * | 11/2003 | Tompras et al. .................. 707/3 |
| 2004/0034652 A1 | | 2/2004 | Hofmann et al. |
| 2004/0054690 A1 | * | 3/2004 | Hillerbrand et al. ....... 707/104.1 |
| 2004/0064349 A1 | | 4/2004 | Humenansky et al. |
| 2004/0215599 A1 | | 10/2004 | Apps et al. |
| 2004/0243483 A1 | * | 12/2004 | Baumann et al. ............... 705/27 |
| 2005/0004930 A1 | | 1/2005 | Hatta |
| 2005/0015363 A1 | * | 1/2005 | Dessloch et al. .................. 707/3 |
| 2005/0114229 A1 | | 5/2005 | Ackley et al. |
| 2005/0165822 A1 | | 7/2005 | Yeung et al. |
| 2005/0187745 A1 | * | 8/2005 | Lurie et al. ...................... 703/11 |
| 2005/0198646 A1 | | 9/2005 | Kortela |
| 2005/0289123 A1 | * | 12/2005 | Dettinger et al. ................ 707/3 |
| 2006/0004852 A1 | | 1/2006 | Abraham et al. |
| 2006/0173663 A1 | | 8/2006 | Langheier et al. |
| 2006/0200795 A1 | | 9/2006 | MacLay |
| 2007/0037214 A1 | * | 2/2007 | Luo et al. ....................... 435/7.1 |
| 2007/0050201 A1 | | 3/2007 | Gardner et al. |
| 2007/0073837 A1 | | 3/2007 | Johnson-McCormick et al. |
| 2007/0073894 A1 | | 3/2007 | Erickson et al. |
| 2007/0083421 A1 | * | 4/2007 | McNair et al. .................. 705/10 |
| 2007/0143266 A1 | | 6/2007 | Tang et al. |
| 2007/0174290 A1 | | 7/2007 | Narang et al. |
| 2007/0229537 A1 | | 10/2007 | Kohli et al. |
| 2007/0288885 A1 | | 12/2007 | Brunel et al. |
| 2008/0005076 A1 | | 1/2008 | Payne et al. |
| 2008/0010597 A1 | | 1/2008 | Seemann et al. |
| 2008/0126022 A1 | | 5/2008 | Hoguet |
| 2008/0126394 A1 | | 5/2008 | Jain et al. |
| 2008/0215583 A1 | | 9/2008 | Gunawardena et al. |
| 2009/0182450 A1 | | 7/2009 | Goldschmidt |
| 2010/0030734 A1 | | 2/2010 | Chunilal |
| 2011/0153524 A1 | | 6/2011 | Schnackel |

OTHER PUBLICATIONS

Co-pending U.S. Appl. No. 11/687,510, filed Mar. 16, 2007 entitled "Collaborative Modeling Environment" by Pieter J. Mosterman et al., 83 pages.
http://www.physiome.org; 1page (printed Mar. 20, 2008).
http://www.opencores.org/projects.cgi/web/opencores/mission, 2 pages (printed Mar. 20, 2008).
Microsoft Office Online: Help and How-to: About finding files, 2 pages, printed Mar. 13, 2007, http://office.microsoft.com/assistance/hfws.aspx?AssetID=HP850527431033&CTT=1&OR....
Microsoft Office Online: Help and How-to: Find a file, 2 pages, printed Mar. 13, 2007, http://office.microsoft.com/assistance/hfws.aspx?AssetID=HP010182231033&CTT=1&OR....
The MathWorks—MATLAB Central—File Exchange, 1 page, printed Aug. 1, 2007, http://www.mathworks.com/matlabcentral/fileexchange/loadCategory.do.
eBay—New & used electronics, cars, apparel, collectibles, sporting goods & more at low . . . , 2 pages, printed Aug. 1, 2007, http://www.ebay.com.
iGoogle, 1 page, printed Aug. 1, 2007, http://www.google.com/ig?hl=en.
The MathWorks—Simulink®—Simulation and Model-Based Design, 2 pages, printed Aug. 1, 2007, http://www.mathworks.com/products/simulink.
Dynast features, 1 page, printed Aug. 1, 2007, http://dynast.net/contents.html.
Exporting a Model to the Web :: Exporting Simulink Models to Web Viewers (Report Generator), 3 pages, pritned Aug. 1, 2007, http://www.mathworks.com/access/helpdesk/help/toolbox/rptgen/ug/bqmz372-1.html.
ebay.com, eBay, Inc., http://web.archive.org/web/20050424074640/http://www.ebay.com/, 1 page, Apr. 24, 2004.
3dexport.com, WebArchlve.org archived site dated Dec. 10, 2005, http://web.archive.org/web/20051210033500/http://www.3dexportcom/, accessed on Sep. 20, 2011.

\* cited by examiner

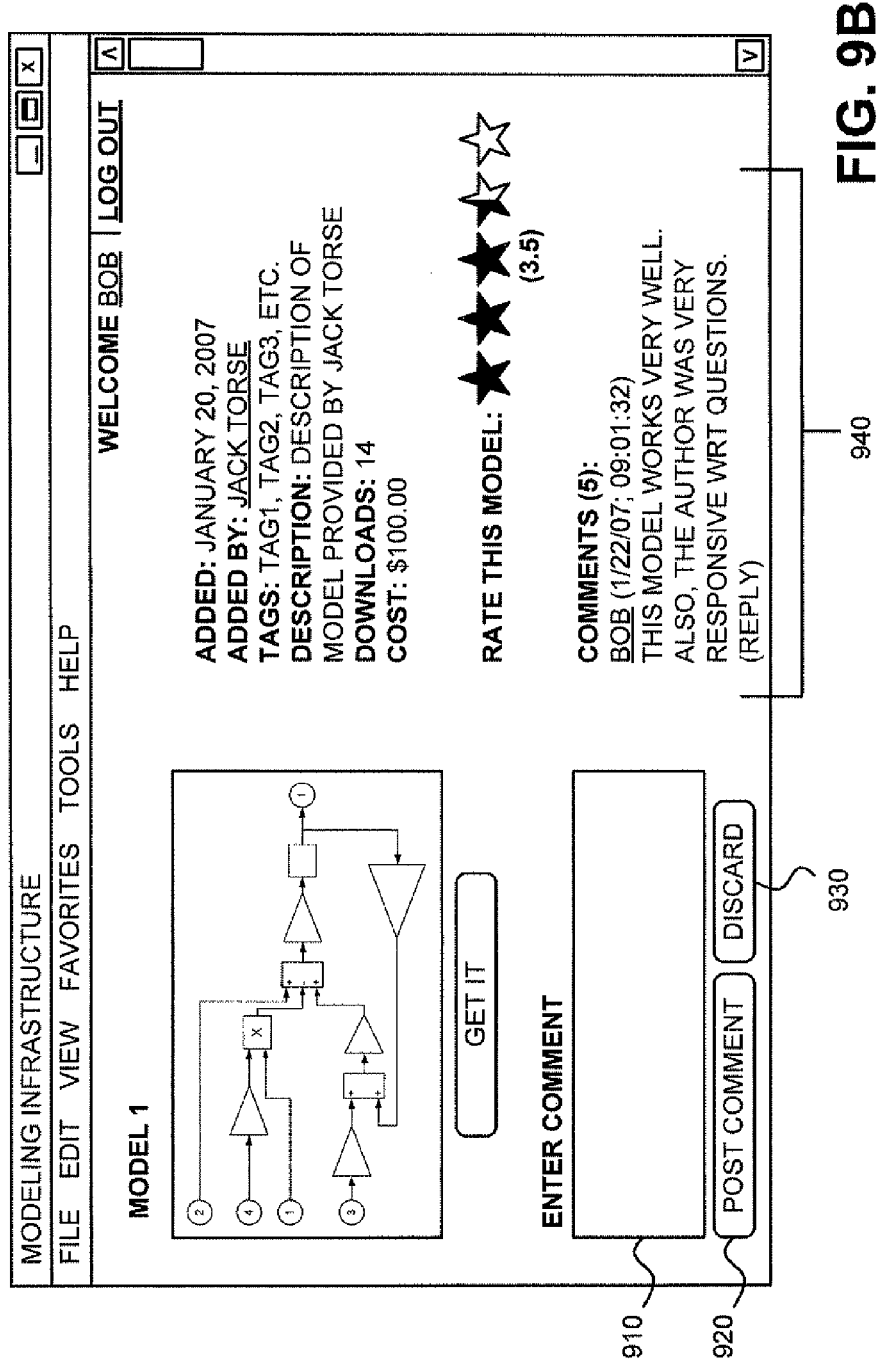

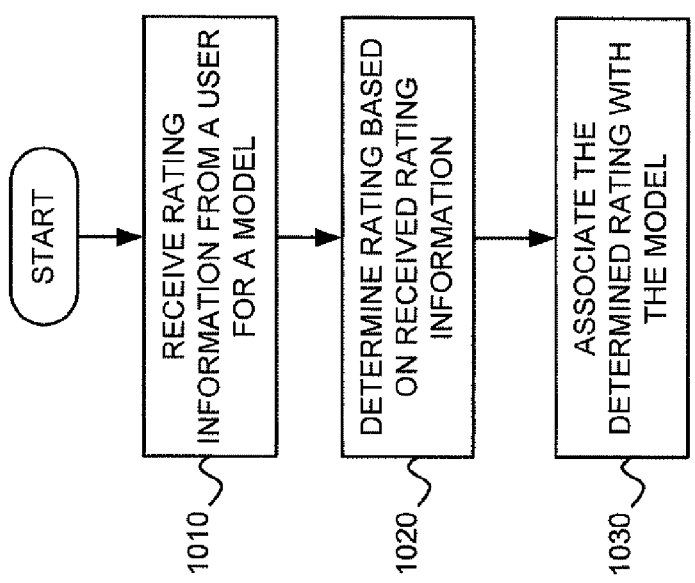

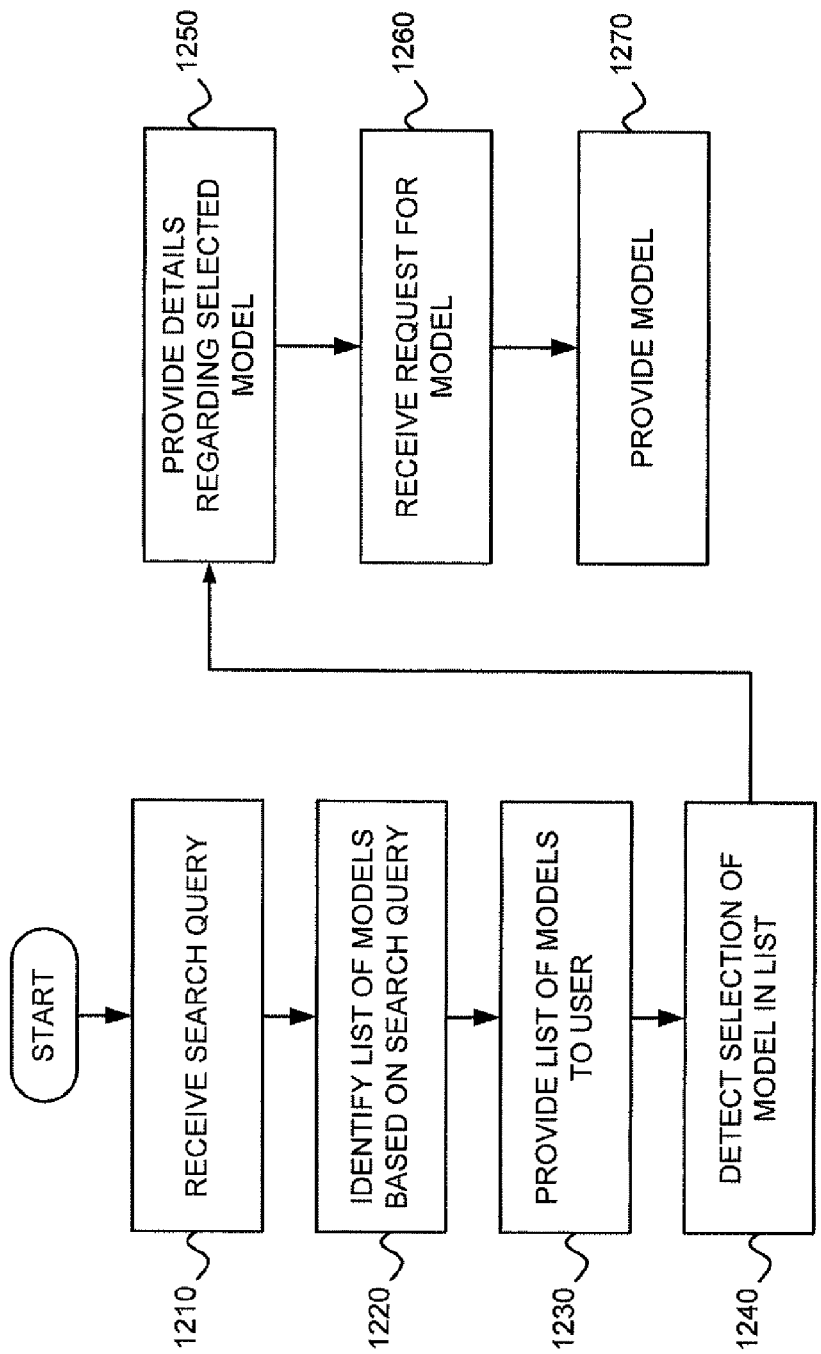

ADVANCED SEARCH

MODELING INFRASTRUCTURE
FILE  EDIT  VIEW  FAVORITES  TOOLS  HELP

TITLE

USER DESCRIPTION

COMPLEXITY

NO. OF INPUTS

NO. OF OUTPUTS

DATE ADDED  BETWEEN  AND

AUTHOR

SEARCH LOCATION

COLLABORATIVE MODELING ENVIRONMENT

RELATED APPLICATION

This application is a continuation of U.S. patent application Ser. No. 11/687,510, filed Mar. 16, 2007, the disclosure of which is incorporated by reference herein in its entirety.

BACKGROUND INFORMATION

Models may be designed for numerical simulations or for other purposes. In some instances, a model designer may need to design a portion of a model (e.g., a pump of a waste water treatment plant) with which the model designer does not have a high level of familiarity. The model designer may make assumptions regarding the unfamiliar portion that are different than the way the portion actually works. Thus, the model may not be completely accurate.

SUMMARY OF THE INVENTION

In one embodiment, a computer-readable medium may store instructions executable by at least one processor for searching for models. The computer-readable medium may include instructions for receiving a search query from a model creation environment; instructions for performing a search to identify a list of models from a model repository based on the search query; instructions for providing the identified list of models; instructions for receiving a request for one model in the identified list of models; and instructions for providing the one model to the model creation environment based on receiving the request.

In another embodiment, a computer-readable medium may store instructions executable by at least one processor. The computer-readable medium may include instructions for receiving a model from a user device; instructions for obtaining information for the received model by executing the received model; and instructions for creating first tags using the obtained information, the created tags being at least one or a combination of displayed to a user or used as part of a model search.

In another embodiment, a computer-readable medium may store instructions executable by at least one processor. The computer-readable medium may include instructions for receiving a model from a user device; instructions for obtaining information for the received model, the obtained information including at least one or a combination of: a number of input ports for the model, one or more characteristics of the input ports, a number of output ports for the model, one or more characteristics of the output ports, whether the model uses continuous time integration or discrete time integration, whether the model is self-contained, information identifying a number of subsystems within the model, a number of charts in the model, a number of discrete states in the model, whether the model adheres to one or more modeling standards, annotations added to the model, or review information about an author of the model; and instructions for at least one or a combination of displaying the obtained information to a user or using the obtained information to determine whether the received model relates to a search query.

In another embodiment, a computer-readable medium may store instructions executable by at least one processor. The computer-readable medium may include instructions for detecting a single selection of an element in a model creation environment that includes a model and instructions for transmitting a portion of the model to a modeling infrastructure in response to detecting the single selection. The transmitting may cause the portion of the model to be published by the modeling infrastructure.

In still another embodiment, a computer-readable medium may store instructions executable by at least one processor. The computer-readable medium may include instructions for detecting selection of an element in a model creation environment; instructions for providing a search dialog box in response to detecting the selection, where the search dialog box allows for a model search to be performed; instructions for receiving a search query; and instructions for transmitting information relating to the search query to a remote location.

In still yet another embodiment, a computer-readable medium may store instructions executable by at least one processor. The computer-readable medium may include instructions for receiving a search query; instructions for identifying a list of models in response to receiving the search query, the identifying including relating the search query to information extracted from the identified models; and instructions for providing the list of models to a user.

In another embodiment, a computer-readable medium may store instructions executable by at least one processor. The computer-readable medium may include instructions for receiving a model; instructions for extracting information from the model; instructions for forming a group of tags using the extracted information; instructions for associating the group of tags with the model; instructions for receiving a search query including one or more sequences of characters; and instructions for determining whether to provide the model in a list of models created for the search query based on the one or more sequences of characters and the group of tags.

In yet another embodiment, a computer-readable medium may store stores instructions executable by at least one processor. The computer-readable medium may include instructions for automatically searching for models; instructions for retrieving a model in response to the searching; and instructions for executing the model using a program to determine whether an issue exists with the model or with the program.

In still yet another embodiment, a computer-readable medium may store instructions executable by at least one processor. The computer-readable medium may include instructions for providing access to a model to a remote model creation environment and instructions for transmitting a rating for the model to the remote model creation environment for display in the remote model creation environment.

In another embodiment, a computing device-implemented method may include receiving a model at a modeling infrastructure; making the model available for peer review; and publishing, via the modeling infrastructure, based on the peer review.

BRIEF DESCRIPTION OF THE DRAWINGS

The accompanying drawings, which are incorporated in and constitute a part of this specification, illustrate one or more embodiments and, together with the description, explain these embodiments. In the drawings.

FIGS. 9A and 9B are exemplary documents that may be provided to allow a user to provide information for a model;

FIG. 10 is a flowchart of an exemplary process for associating a rating with a model;

FIG. 12 is a flowchart of an exemplary process for obtaining a model;

FIGS. 13A-13D are exemplary documents that may be provided to a user in relation to obtaining a model;

DETAILED DESCRIPTION

The following detailed description of exemplary embodiments refers to the accompanying drawings. The same reference numbers in different drawings may identify the same or similar elements. Also, the following detailed description does not limit the invention.

Overview

Figure 1:
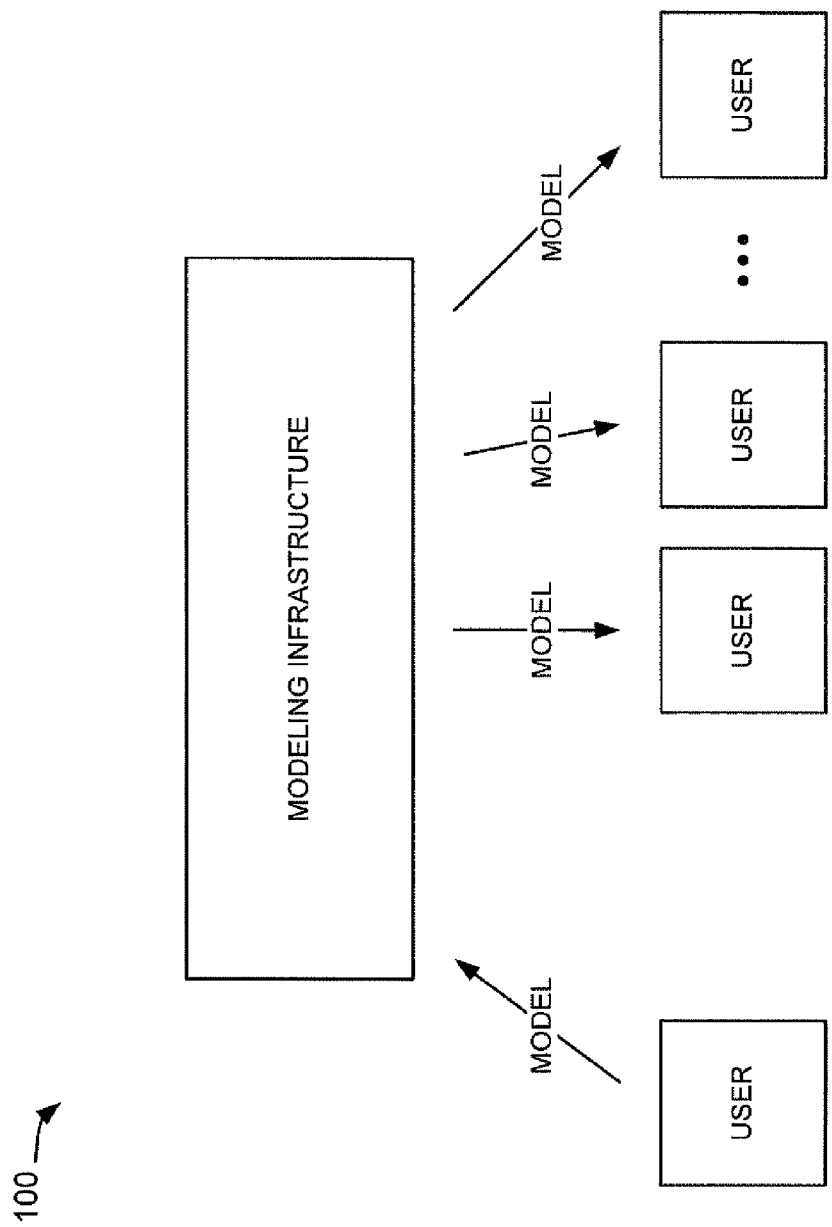
FIG. 1 is an exemplary diagram illustrating a concept consistent with exemplary embodiments.

Systems and methods described herein may provide a modeling infrastructure that allows users to make models available to other users and to obtain models of interest. FIG. 1 is an exemplary diagram illustrating a concept 100 consistent with exemplary embodiments. As illustrated in FIG. 1, a modeling infrastructure may receive a model (such as a Simulink® modeling environment model) from a user and process the model to allow the model to be shared with other users. In one embodiment, the modeling infrastructure may allow a user to share a model with other users (e.g., publish the model) via a "1-click" (or simplified) process. In this embodiment, the modeling infrastructure may extract information from the received model and associate the extracted information with the model (e.g., as tags). The modeling infrastructure may also allow users to search and obtain models that have been shared (e.g., uploaded to the modeling infrastructure and/or indicated to the modeling infrastructure as available for sharing). In essence, the modeling infrastructure may provide a model sharing ecosystem where users can easily share models with other users and obtain models of interest. In some embodiments, users may share comments regarding models that are available via the modeling infrastructure and may rate these models. In this way, users can use other users' opinions to distinguish between two possible models of interest.

A "document," as the term is used herein, is to be broadly interpreted to include any machine-readable and/or machine-storable work product. A document may include, for example, an e-mail, a file, a dialog, a combination of files, one or more files with embedded links to other files, a graphical user interface, etc. In the context of the Internet, a common document is a web page. Documents often include textual information and may include embedded information (such as meta information, images, hyperlinks, etc.) and/or embedded instructions (such as Javascript, etc.). A "tag" as used herein may broadly include any type of data that may be used to relate information to an object. An example of a tag may include a meta tag or another type of tag. A "model" may be broadly defined as a representation of something (e.g., an object, a system, etc.). A "computational model" may be broadly defined as a model that contains an element that represents computation. A computational model may be associated with static and/or dynamic semantics. The computational model may include entities. Relations between the entities may be explicitly represented. In graphical models, these relations may be represented as lines. In textual models, these relations may represented based on the order of syntactic entities in a sentence. A computational model with dynamic semantics can be interpreted by an execution engine to generate a behavior, where a behavior refers to a change of value of a variable. Dynamic models may include one or more data structures to represent elements that capture aspects of the dynamics (e.g., the behavior). Examples of such aspects may include the identity of the values that represent how a new value of a variable is computed (e.g., the value of a derivative of a variable with respect to time or a time delayed value of a variable), how the sequence of values is constructed, whether it is as a relation with an independent variable (e.g., time), whether the values should be computed with a given period, etc. As such in a dynamic model, a variable can assume multiple values when evaluated. These aspects for different model elements are often related, for example, to ensure integrity and consistency, and can be automatically derived and reconciled by model processing.

Exemplary Network Configuration

Figure 2:
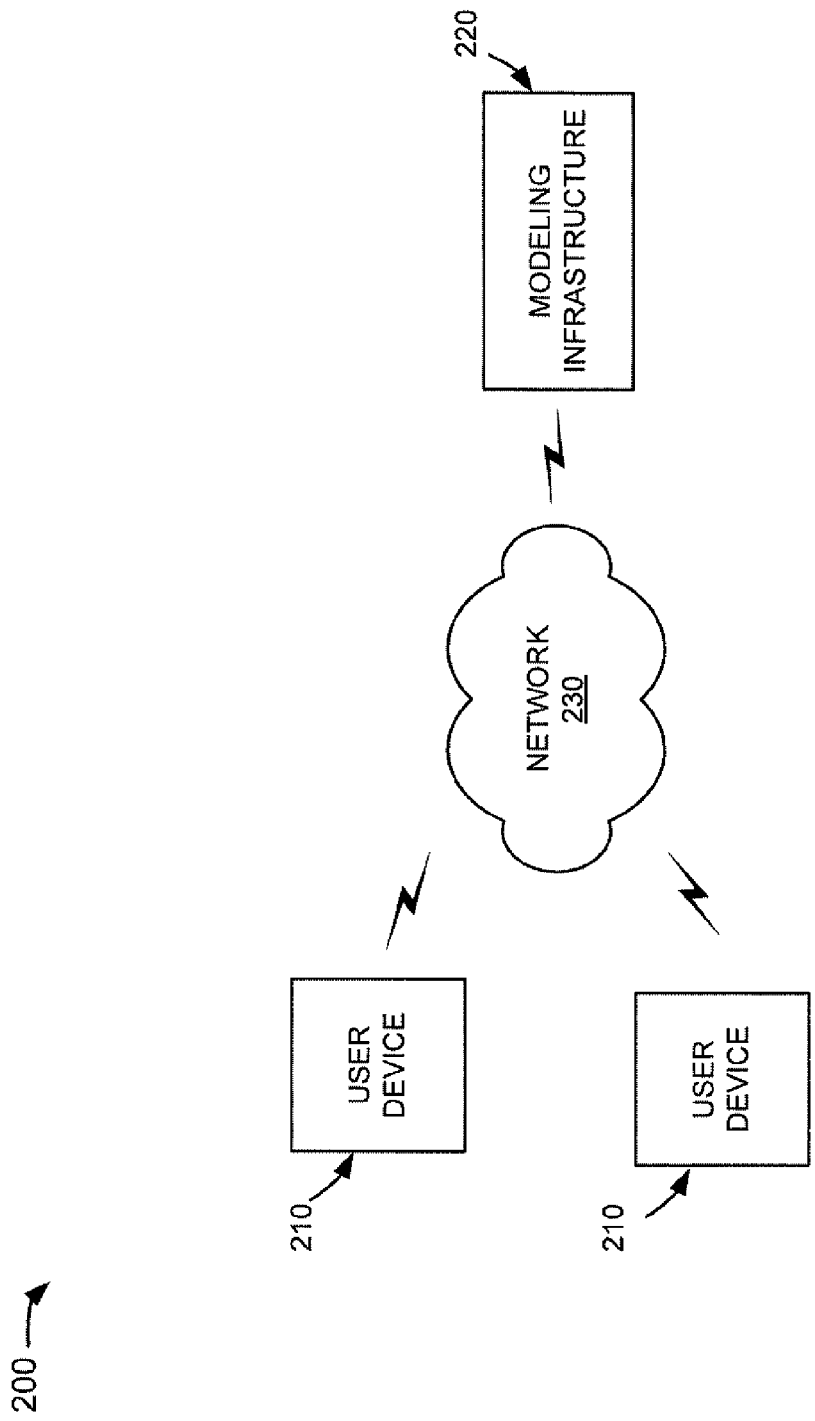
FIG. 2 is an exemplary diagram of a network in which systems and methods consistent with exemplary embodiments may be implemented.

FIG. 2 is an exemplary diagram of a network 200 in which systems and methods described herein may be implemented. Network 200 may include multiple user devices 210 connected to a modeling infrastructure 220 via a network 230. Two user devices 210 and one modeling infrastructure 220 have been illustrated as connected to network 230 for simplicity. In practice, there may be more or fewer user devices and more modeling infrastructures. Also, in some instances, a user device may perform a function that is described as being performed by the modeling infrastructure and the modeling infrastructure may perform a function that is described as being performed by a user device.

User devices 210 may include user entities. An entity may be defined as a device, such as a personal computer, a laptop, a personal digital assistant (PDA), a smartphone, or another type of computation or communication device, a thread or process running on one of these devices, and/or an object executable by one of these devices. Modeling infrastructure 220 may include one or more hardware and/or software components that receive models and information relating to models from user devices 210 and provide user devices 210 with the ability to access the models.

Network 230 may include a local area network (LAN), a wide area network (WAN), a metropolitan area network (MAN), a telephone network, such as the Public Switched Telephone Network (PSTN) or a cellular network, an intranet, the Internet, or a combination of networks. User devices 210 and modeling infrastructure 220 may connect to network 230 via wired and/or wireless connections.

It will be appreciated that a user device 210 may perform one or more acts described below as being performed by modeling infrastructure 220 and that modeling infrastructure 220 may perform one or more acts described below as being performed by a user device 210.

Exemplary User Device Architecture

Figure 3:
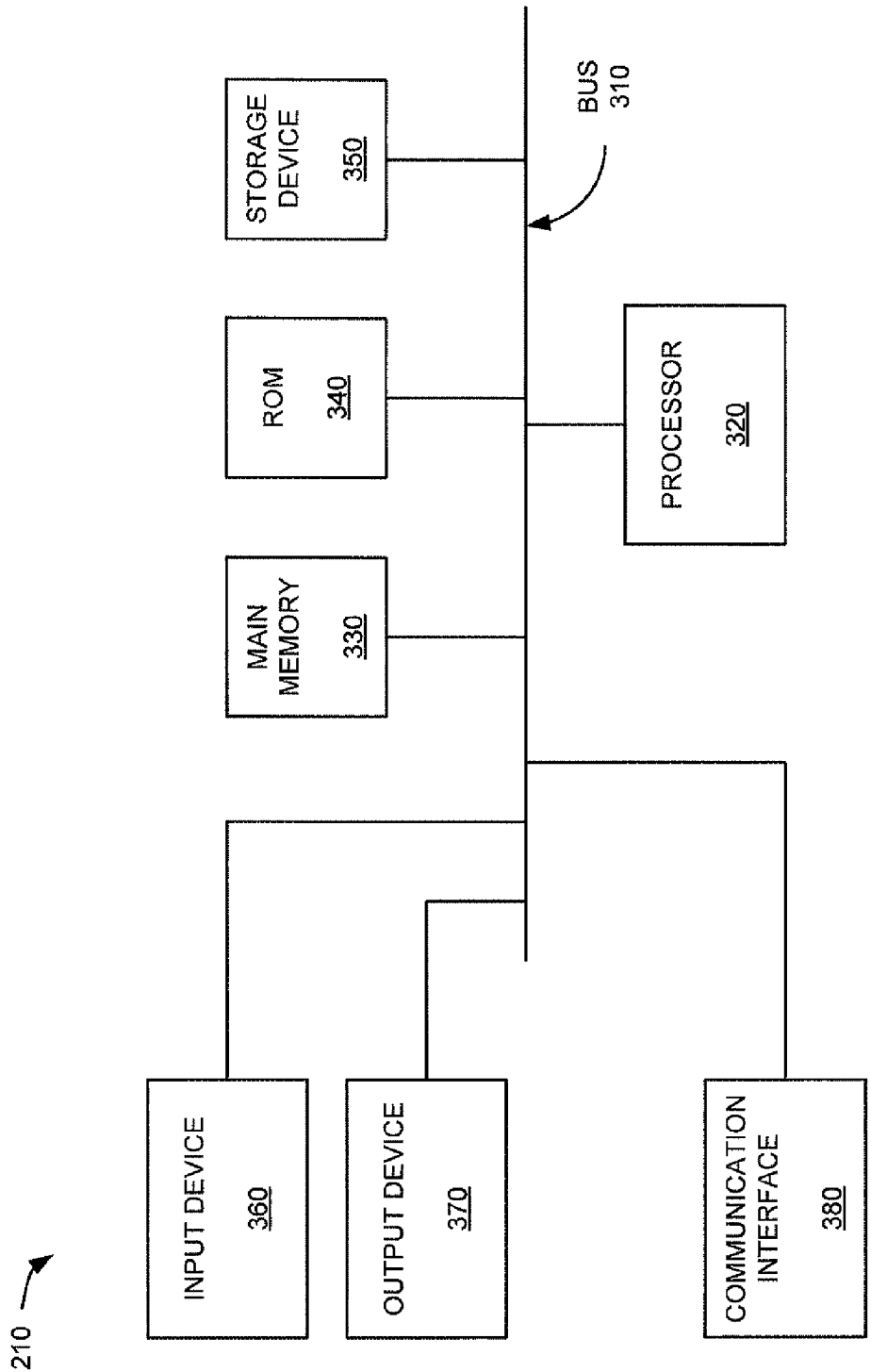
FIG. 3 is an exemplary diagram of the user device of FIG. 2 in an exemplary embodiment.

FIG. 3 is an exemplary diagram of a user device 210. As illustrated, user device 210 may include a bus 310, a processor 320, a main memory 330, a read only memory (ROM) 340, a storage device 350, an input device 360, an output device 370, and a communication interface 380. Bus 310 may include a path that permits communication among the elements of user device 210.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to user device 210, such as a keyboard, a mouse, a pen, voice recognition and/or biometric mechanisms, an accelerometer or gyroscope-based motion input device, a camera, etc. Output device 370 may include a mechanism that outputs information to the operator, including a display, a printer, a speaker, etc. Communication interface 380 may include any transceiver-like mechanism that enables user device 210 to communicate with other devices and/or systems. For example, communication interface 380 may include mechanisms for communicating with modeling infrastructure 220 via a network, such as network 230.

As will be described in detail below, user device 210, consistent with exemplary embodiments, may perform certain processing-related operations. User device 210 may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, embodiments described herein are not limited to any specific combination of hardware circuitry and software.

Exemplary Modeling Infrastructure Architecture

Figure 4:
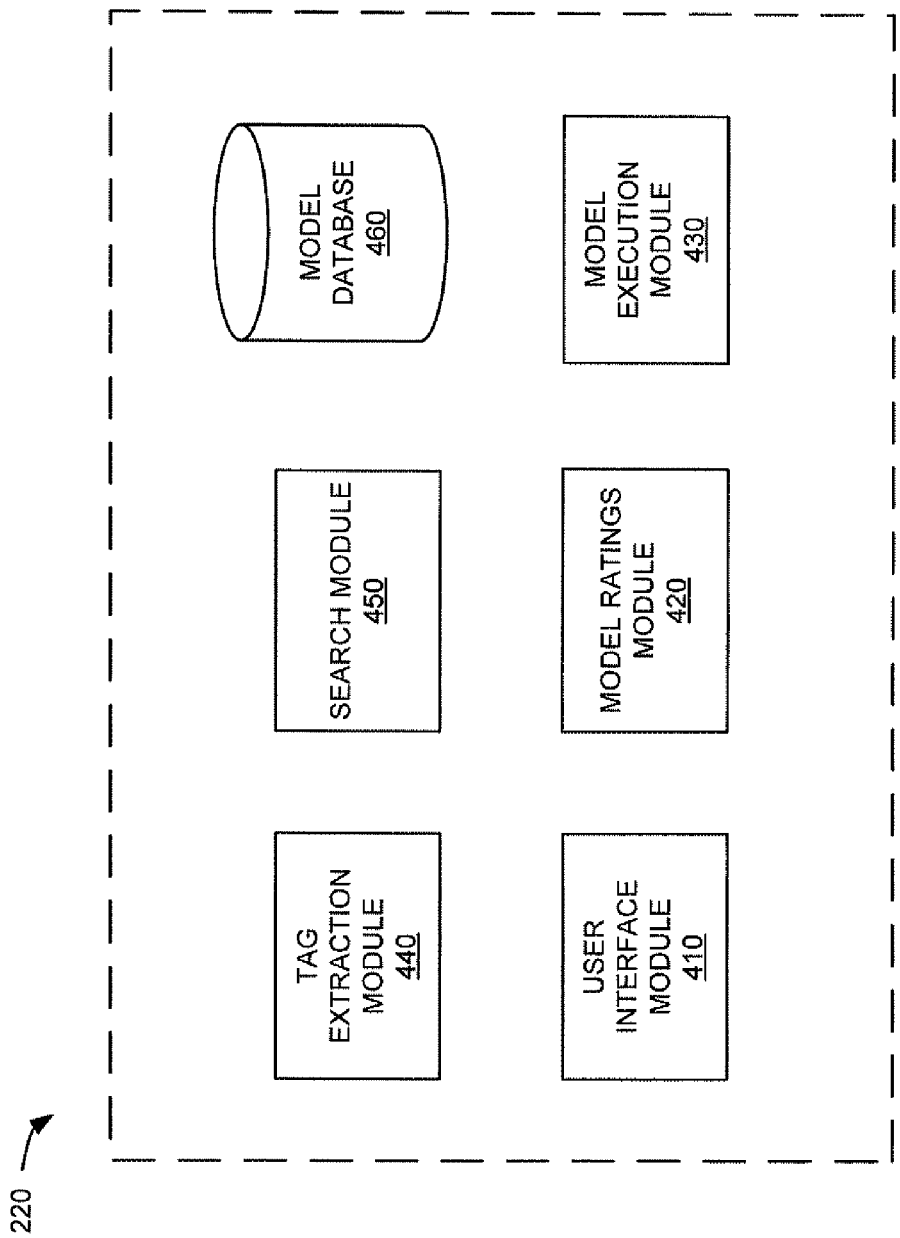
FIG. 4 is an exemplary diagram of the modeling infrastructure of FIG. 2 in an exemplary embodiment.

FIG. 4 is an exemplary diagram of modeling infrastructure 220. As shown in FIG. 4, modeling infrastructure 220 may include a user interface module 410, a model ratings module 420, a model execution module 430, a tag extraction module 440, a search module 450, and a model database 460. User interface module 410, model ratings module 420, model execution module 430, tag extraction module 440, search module 450, and model database 460 may be implemented as software and/or hardware components within a single server entity, or as software and/or hardware components distributed across multiple server entities. In one embodiment, one or more of these modules may be implemented partly or wholly by an individual.

User interface module 410 may include one or more software and/or hardware components that provide documents to user devices. For example, in one embodiment, user interface module 410 may provide documents that allow users to search for and obtain models of interest.

Model ratings module 420 may include one or more software and/or hardware components that allow users to rate models that are associated with model infrastructure 220. In one embodiment, model ratings module 420 may receive rating information from a user and may determine a rating for a model based on the received rating information. In some embodiments, model ratings module 420 may determine more than one rating for a model. Each rating may be associated with a different rating characteristic, such as operating speed, memory usage, sensitivity to disturbances, number of zero crossings, performance on Japanese platform, etc. Thus, as an example, the ratings associated with a model may indicate that the model "runs slowly," "takes a lot of memory," "is very sensitive to disturbances," "includes a lot of zero crossings," "cannot run well on Japanese platform," etc.

Model execution module 430 may include one or more software and/or hardware components that determine whether models function properly. In one embodiment, model execution module 430 may receive or access a model and may execute the model to verify the model's functional status. If the model does not function properly (e.g., an error is produced when the model is executed), model execution module 430 may, for example, notify the user that the model cannot be shared.

Tag extraction module 440 may include one or more software and/or hardware components that create tags (or other forms of data that allow for searching of models) for a given model. In one embodiment, tag execution module 440 may receive a model, analyze the model to identify characteristics of the model, and associate the extracted information as tags with the model. The information may include any information that would be of interest to a user searching for a model. For example, the information may include information indicating the complexity (e.g., cyclomatic complexity) of the model, the number of warnings that an editing style is violated, the number of input ports for the model and characteristics of the input ports, the number of output ports for the model and characteristics of the output ports, whether the model uses continuous time integration or discrete time integration, whether the model is self-contained, information identifying the number of subsystems within the model, information identifying a product or products on which the model relies (e.g., a user will need to have or obtain a license for a particular product), annotations added to the model, the software that was used to create the model, the version of the software that was used to create the model, whether the model adheres to certain modeling standards (e.g., whether the model results in Motor Industry Software Reliability Association (MISRA) compliant code, whether the model can be used in DO-178B certification, etc.), the coverage of model functionality when executed (e.g., the percent decision coverage, condition coverage, condition/decision coverage, modified condition/decision coverage, etc.), etc.

Search module 450 may include one or more software and/or hardware components that allow users to search for models. For example, search module 450 may include a model search engine in which a user may enter search terms and/or other search criteria. Search module 450 may use the search terms and/or search criteria to identify a list of candidate models.

Model database 460 may include one or more databases that may store models (which includes storing actual models, a portion of the models, links to models (e.g., in the form of uniform resource locators (URLs)), etc.) and information relating to models, such as tags, user reviews (or comments), ratings, cost, etc. In some instances, model database 460 may be considered a repository of models and information relating to models. In one embodiment, model database 460 may store a model, including all of the model's dependent files (e.g., parameter files), in a single file or virtual group. The single file may include, for example, a single project, a single zipped file, a single archive, etc. In this way, a user can download a single file that includes all of the information for executing a model. Database 460 may include one or more physical databases, which may be located at modeling infrastructure 220 or one or more remote locations in network 200, or may represent a conceptual database/repository of models.

Although FIG. 4 shows exemplary components of modeling infrastructure 220, in other embodiments, modeling infrastructure 220 may include fewer, different, or additional components than depicted in FIG. 4. Moreover, one or more components of modeling infrastructure 220 may perform one or more functions of one or more other components of modeling infrastructure 220.

Exemplary Processes

Figure 5:
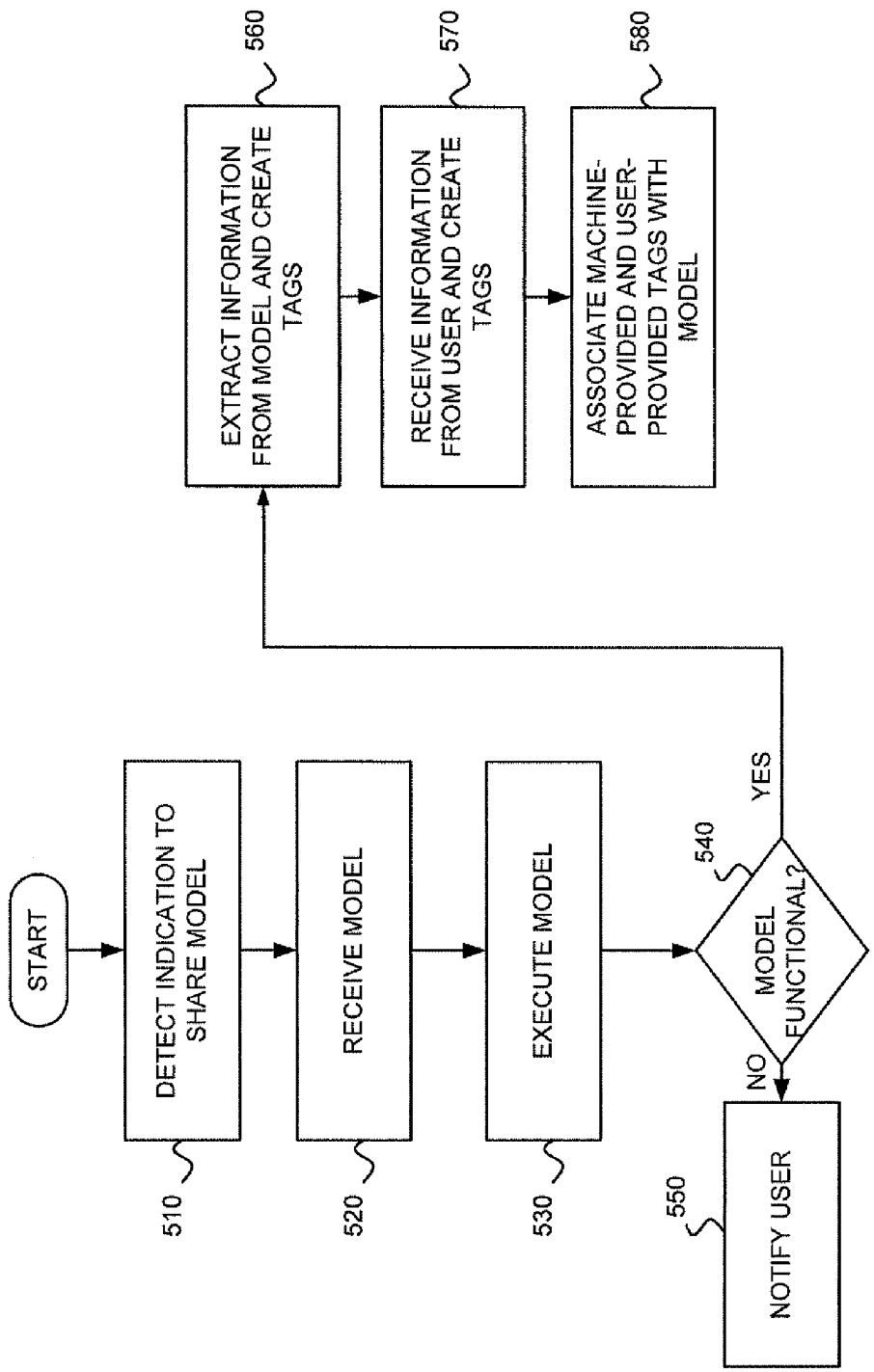
FIG. 5 is a flowchart of an exemplary process for sharing a model in an exemplary embodiment.

FIG. 5 is a flowchart of an exemplary process for sharing a model in an exemplary embodiment. The processing of FIG. 5 may be performed by one or more software and/or hardware components within modeling infrastructure 220. Alternatively, the processing may be performed by one or more software and/or hardware components within another device or a group of devices separate from or including modeling infrastructure 220. It will be appreciated that the model sharing described herein may actually correspond to sharing a portion of a model. The portion may be a stand-alone model that may be referenced in turn.

Processing may begin with modeling infrastructure 220 detecting an indication to share a model (block 510). Modeling infrastructure 220 may receive a request to share a model from user device 210 and, in response, may establish a connection with user device 210. In other embodiments, a connection between modeling infrastructure 220 and user device 210 may be established before receiving the request. As part of establishing the connection with user device 210, modeling infrastructure 220 may authenticate the user of user device 210. For example, modeling infrastructure 220 may request that the user of user device 210 provide a user identifier and possibly a password.

Figure 6A:
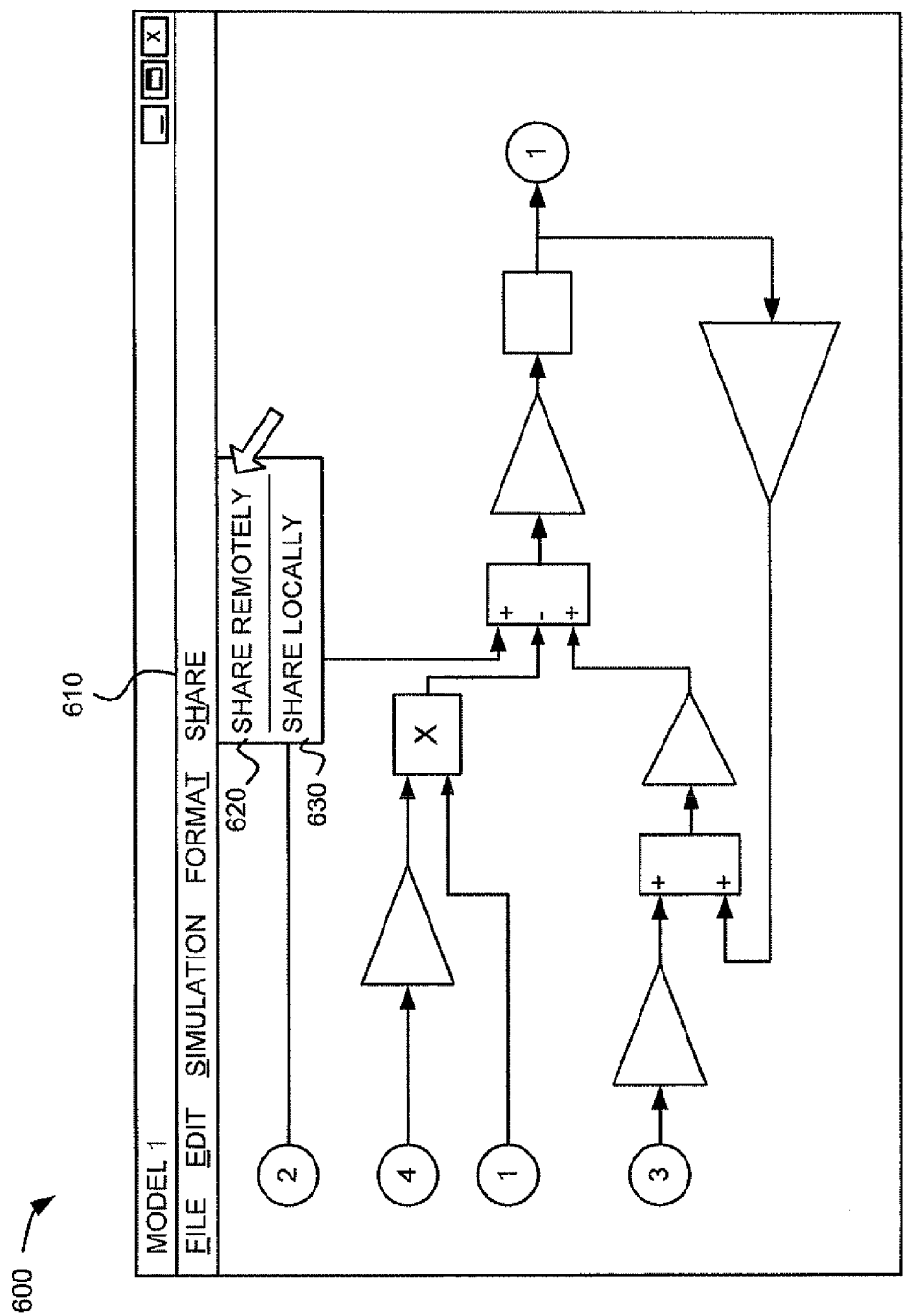
FIGS. 6A-6C are exemplary documents that may be provided to allow a user to share a model.
Figure 6B:
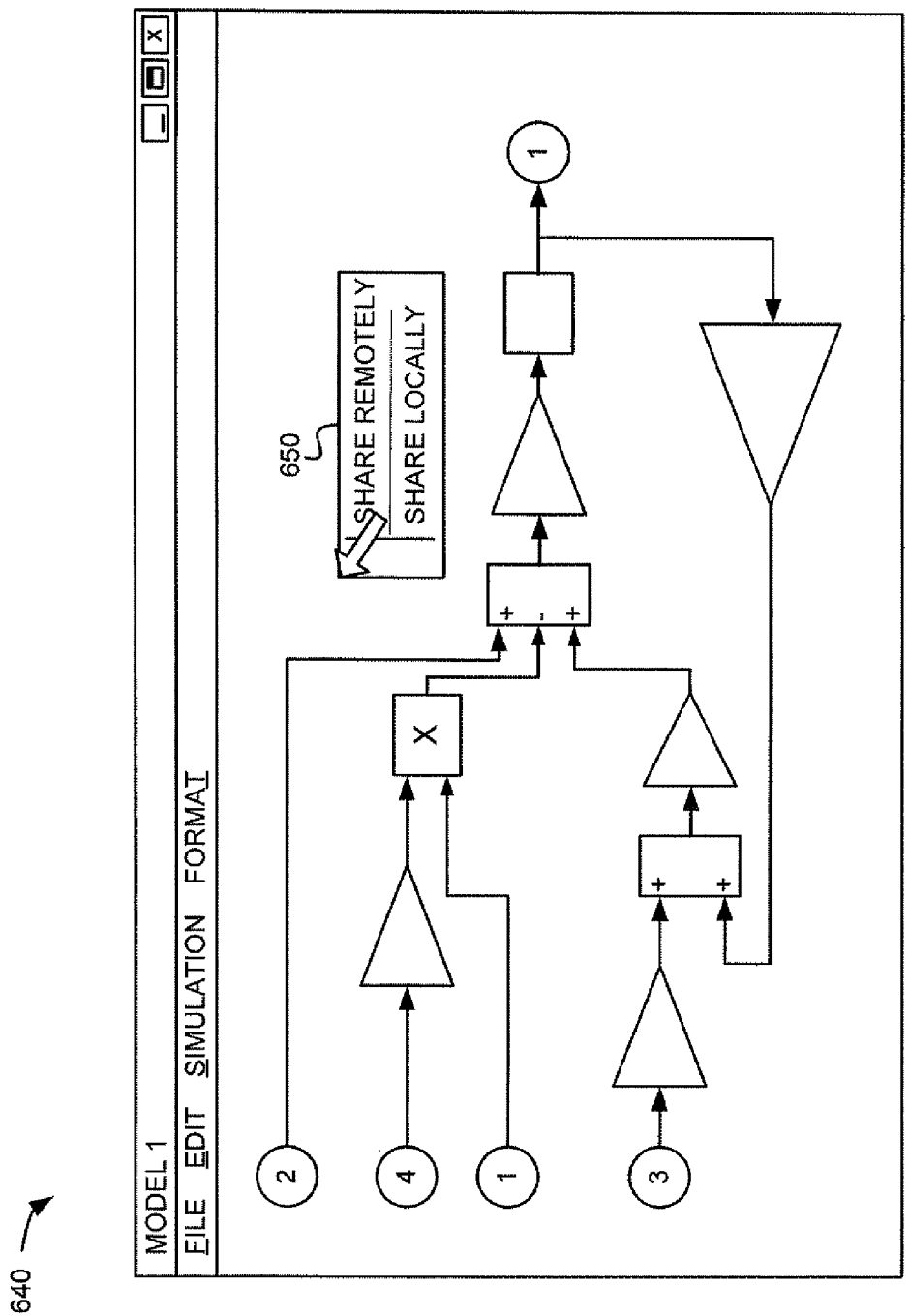
Figure 6C:
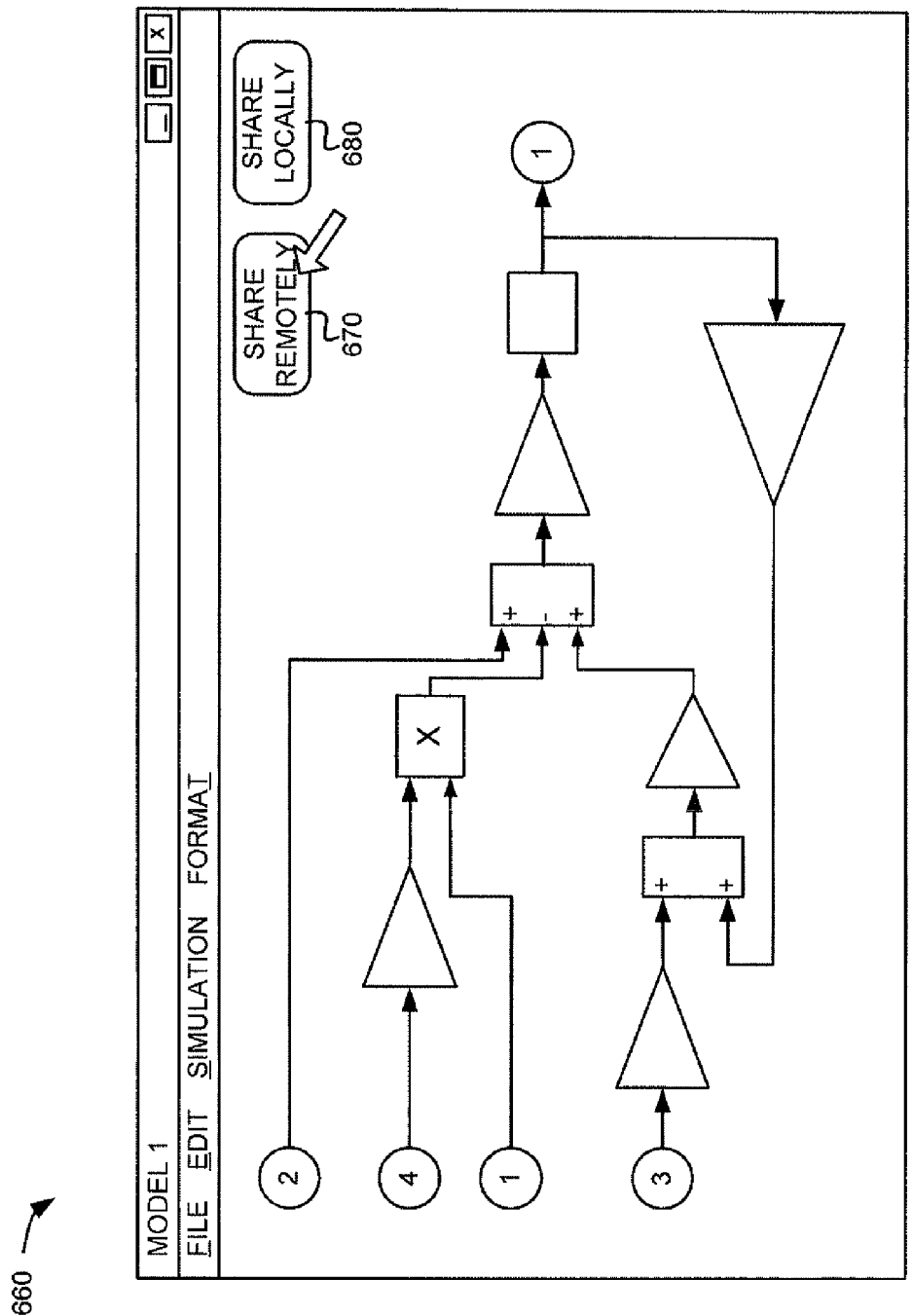

FIGS. 6A-6C are exemplary graphical user interfaces that may be provided to a user of user device 210. In FIG. 6A, assume a user has created a model in a model creation environment, such as the Simulink® modeling environment. A document 600, associated with the model creation environment, may include a menu. The menu may include a menu element 610 (called "SHARE") that allows the user to share the model created by the model creation environment. In one embodiment, menu element 610 may be associated with menu items SHARE REMOTELY 620 and SHARE LOCALLY 630. If selected by the user, menu item SHARE REMOTELY 620 may allow the user to store the created model at modeling infrastructure 220 (or provide a link to a remote location where the model is available) to make the model available from modeling infrastructure 220. Menu item SHARE LOCALLY 630, on the other hand, may allow the user to tag the created model as shared to make the model available locally from user device 210. By sharing the model locally, the model may be made visible to other user devices and the other user devices may obtain the model from user device 210.

As an alternative to (or in addition to) providing the ability to share a model via a menu element, a user may share a model in other ways. For example, as illustrated in FIG. 6B, a user who has created a model may right-click on the model to cause a pop-up menu 650 to appear in a document 640. Similar to SHARE menu element 610, pop-up menu 650 may be associated with a SHARE REMOTELY menu item and a SHARE LOCALLY menu item that may allow the user to perform the operations described above. As yet another alternative and as illustrated in FIG. 6C, dedicated buttons 670 and 680 may be provided in a document 660 to allow the user to share the model remotely and locally, respectively. In one embodiment, the model that is to be shared may be represented by an element in another model. For example, right-clicking on that element may cause a pop-up menu to be displayed that allows only that element to be shared. If the element is a referenced model, the interface information may be available. If the element is a subsystem, some model processing may occur to infer the interface information.

Returning to the processing of FIG. 5, modeling infrastructure 220 may receive the created model from user device 210 (block 520). In one embodiment, user device 210 may transfer the created model to modeling infrastructure 220 regardless of whether the user indicates that the model is to be shared remotely or locally.

Modeling infrastructure 220 may execute the received model (block 530). Modeling infrastructure 220 may execute the model to determine whether the model is actually functional. If the model executes without an error occurring, modeling infrastructure 220 may determine that the model is functional. If, on the other hand, execution of the model produces an error, modeling infrastructure 220 may determine that the model is not functional. In other embodiments, additional criteria or other criteria may be used to determine if a received model is functional. Execution of the model may alternatively or additionally include processing the received model in other ways. For example, modeling infrastructure 220 may perform a consistency check on the connections included in the model to determine, for example, whether data types match, whether interface timing information matches, etc. In some embodiments, some information may be obtained by "compiling" the model, without executing the model. Compiling a model performs model processing to obtain all model attributes to be used for execution (e.g., the sample rate of all blocks in a block diagram and the data types of all model variables). Compiling a model may also perform optimizations by removing superfluous model elements, by combining computations such as replacing two consecutive multiplications with constant factors by one multiplication with the aggregate factor, by reducing computations that provide the same result for each evaluation during a behavior to a constant value, etc.

Figure 7:
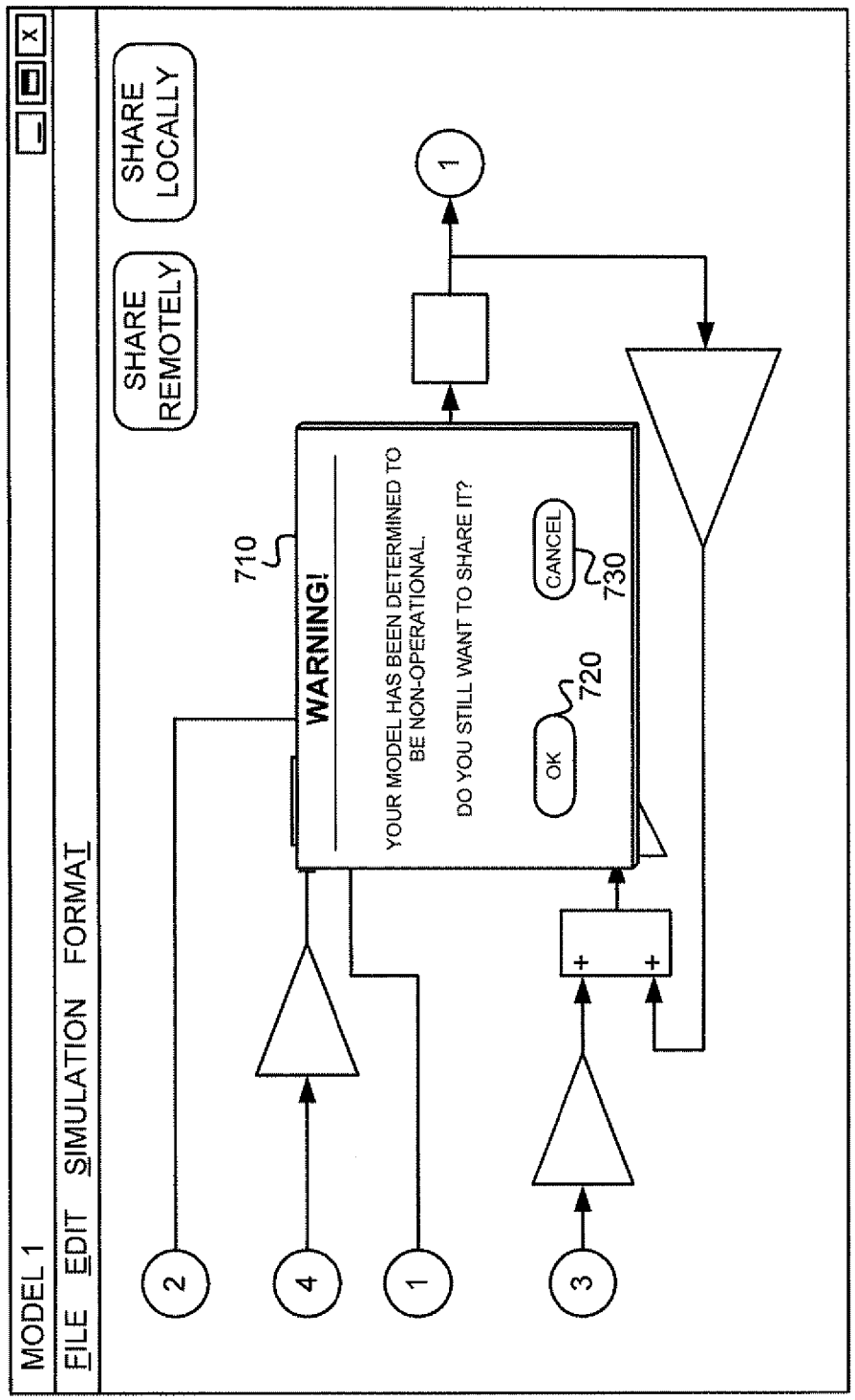
FIG. 7 is an exemplary notification that may be provided to a user if a user's attempt to share a model is unsuccessful.

If modeling infrastructure 220 determines the model is not functional (block 540—NO), modeling infrastructure 220 may notify the user that the attempt to share the model failed (block 550). FIG. 7 illustrates an exemplary notification message 710 that may be provided to the user if an attempt to share the model failed. In some embodiments, notification message 710 may include buttons, such as buttons 720 and 730, that allow the user to continue to share the non-operational model in the manner described below or not share the non-operational model, respectively. Other ways of notifying the user are also possible. For example, modeling infrastructure 220 may transmit a notification via e-mail, instant message, or in another manner.

If modeling infrastructure 220 determines the model is functional (block 540—YES), modeling infrastructure 220 may analyze the model to extract information regarding the model (block 560). This analysis may include interpreting the model, compiling the model, and/or executing the model. As indicated above, the extracted information may include any information that a user may find important when searching for a model. For example, the extracted information may include information indicating the complexity (e.g., cyclomatic complexity) of the model, the number of input ports for the model and characteristics of the input ports (e.g., data type, sample rate, etc.), the number of output ports for the model and characteristics of the output ports, whether the model uses continuous time integration or discrete time integration, whether the model is self-contained, information identifying the number of subsystems within the model, whether the model adheres to certain modeling standards (e.g., whether the model results in MISRA compliant code, whether the model can be used in DO-178B certification, etc.), information identifying a product or products on which the model relies (e.g., a user will need to have or obtain a license for a particular product), annotations added to the model, the software used to create the model, the version of the software that was used to create the model, information about an author of the model, and/or other information. For example, other information that may be extracted may include information identifying the number of state transition diagrams (charts) that are present in a model, information relating to state machine elements (e.g., how many AND states are in the model, how many OR states are in the model, how may substates are in the model, how many graphical functions are in the model, how many history junctions are in the model, how many junctions are in the model, how many events are registered in the model, how many input events are in the model, how many output events are in the model, characteristics of a state machine embedded in a block diagram, such as a sample rate, etc.), whether the state transition diagram follows a style (such as Moore or Mealy), information relating to class diagrams that may be in the model (e.g., how many classes, how deep the hierarchy is, whether there is multiple inheritance, whether interface classes are used, how many private, protected, and public elements are present, etc.), etc. For scenario diagrams in the model, modeling infrastructure 220 may extract information relating to how many messages are passed between timelines, how many timelines there are, whether preemption is present, etc. Modeling infrastructure 220 may create tags using the extracted information (block 560). These tags may be considered as "machine-provided" tags.

Modeling infrastructure 220 may receive information regarding the model from the user (block 570). The information may include, for example, the user's description of the model (e.g., the operating range in which the model should be executed), information about the user (e.g., contact information for the user (such as an e-mail address, an instant messenger identifier, a telephone number, Internet Protocol (IP) address, voice over internet protocol (VoIP) address, etc.), the user's education, the number of models that the user has shared, etc.), and/or other information. In addition, the information may include any or all of the information that may be extracted from the model. Some or all of this user-provided information may be used to create tags (block 570). Moreover, the user may provide tags to be associated with the model. The foregoing tags may be considered as "user-provided" tags.

Modeling infrastructure 220 may also receive information about the user from other users. For example, other users may provide information indicating how prompt the user was in providing help regarding his/her model, whether the user produced good models in the past, whether the user explains his/her models well, etc. Some or all of this information may also be used to create tags. These tags may also be considered as user-provided tags.

Modeling infrastructure 220 may associate the machine-provided tags and the user-provided tags with the model (block 580). Modeling infrastructure 220 may further store the model. For example, in those situations where the user had indicated that the model is to be shared remotely, modeling infrastructure 220 may store the model (or a link to the model on a remote device) and the tags in database 460. In those situations where the user had indicated that the model is to be shared locally, modeling infrastructure 220 may discard the model and store a link to the model (e.g., on user device 210) and the tags in database 460. Once the model has been processed by modeling infrastructure 220, the model can be considered as published (e.g., available for sharing).

In one embodiment, a model may undergo a review process, such as by peers, prior to becoming published. For example, after some or all of the above processing, a received model may be submitted to one or more model evaluators to determine whether the model is acceptable for publishing. In some situations, a model evaluator(s) may send a received model back to the author for revisions. The model may be revised until the model is accepted by the model evaluator(s). Once accepted by the model evaluator(s), the model may be published. Moreover, additional documents can be included with the model submission, such as descriptions of how model parameters were derived, what laws of physics were employed to design the model, explanations on potential and actual model use, what assumptions were made about the model, etc.

Once the model has been made available for sharing, modeling infrastructure 220 may, in one embodiment, use a version control system to manage revisions of the model. For example, changes to the model may be identified by incrementing an associated revision number or letter code.

In one embodiment, modeling infrastructure 220 may re-execute the model when the model creation environment has been updated. Modeling infrastructure 220 may send notifications based on a result of the re-execution.

Figure 8:
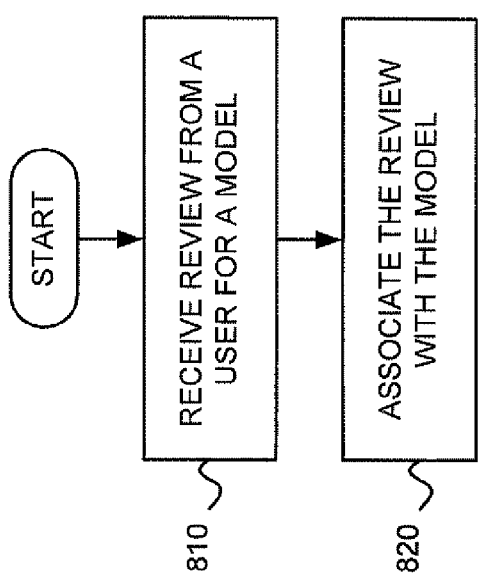
FIG. 8 is a flowchart of an exemplary process for associating information with a model.

FIG. 8 is a flowchart of an exemplary process for associating a review with a model in an exemplary embodiment. The processing of FIG. 8 may be performed by one or more software and/or hardware components within modeling infrastructure 220. Alternatively, the processing may be performed by one or more software and/or hardware components within another device or a group of devices separate from or including modeling infrastructure 220.

Figure 9A:
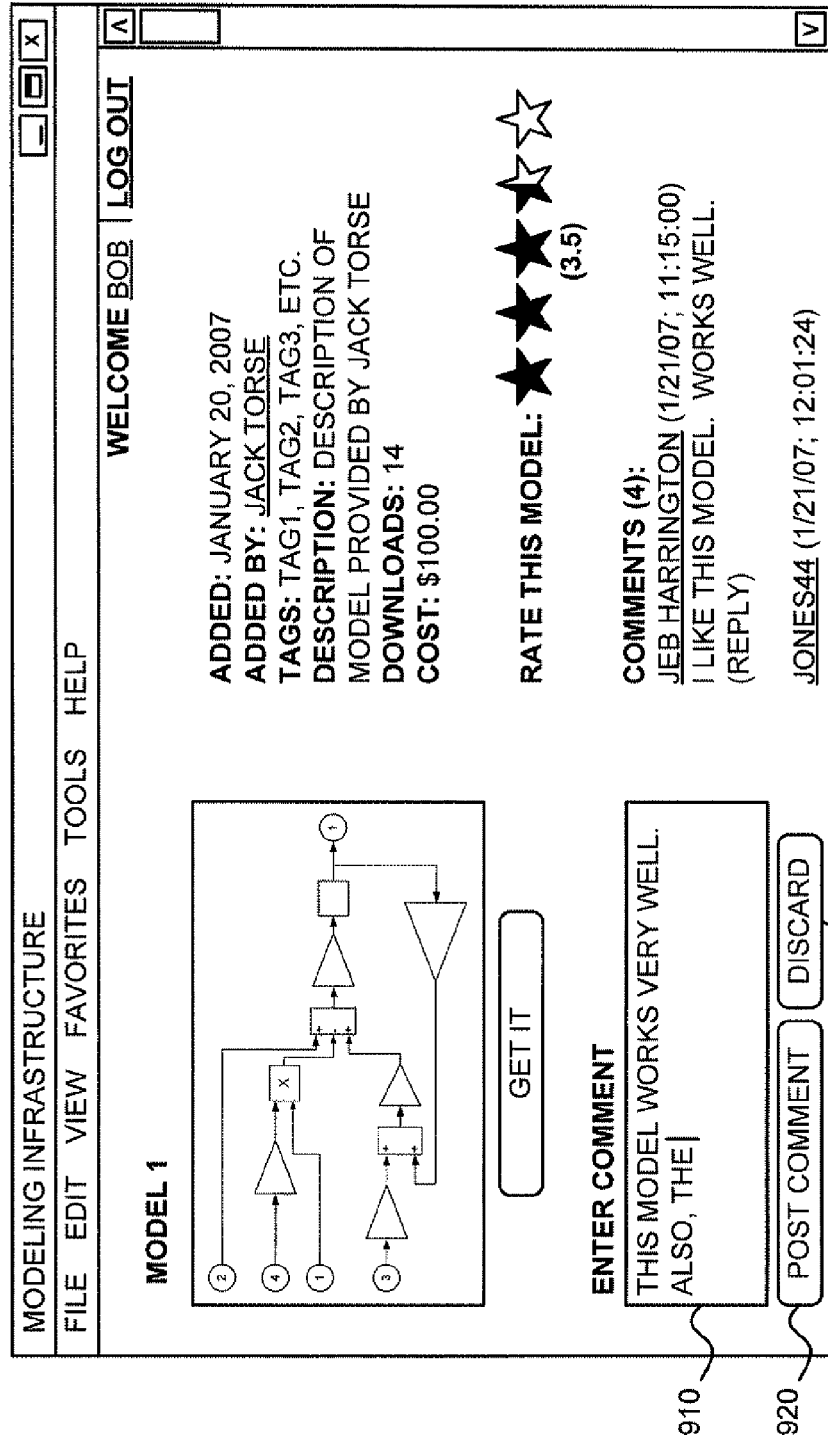

Processing may begin with modeling infrastructure 220 receiving a review for a model (block 810). Modeling infrastructure 220 may, for example, provide a document, such as document 900 (FIG. 9A), to a user of a user device 210. Document 900 may include an area 910 that allows the user to comment on (or review) the model being displayed in document 900. Once the user has entered a comment (or review) in area 910, the user may elect to post the comment by selecting button 920 or discard the comment by selecting button 930. In some embodiments, modeling infrastructure 220 may request that the user log in to modeling infrastructure 220 by, for example, providing a user identifier and possibly a password, before the user is allowed to post a comment.

Modeling infrastructure 220 may associate the review with the model (block 820). For example, modeling infrastructure 220 may store the review in database 460. Modeling infrastructure 220 may also associate the review with information identifying the user who provided the review. Thereafter, if the model is later viewed, user's review 940 may be displayed, as illustrated in FIG. 9B.

FIG. 10 is a flowchart of an exemplary process for associating a rating with a model in an exemplary embodiment. The processing of FIG. 10 may be performed by one or more software and/or hardware components within modeling infrastructure 220. Alternatively, the processing may be performed by one or more software and/or hardware components within another device or a group of devices separate from or including modeling infrastructure 220.

Figure 11A:
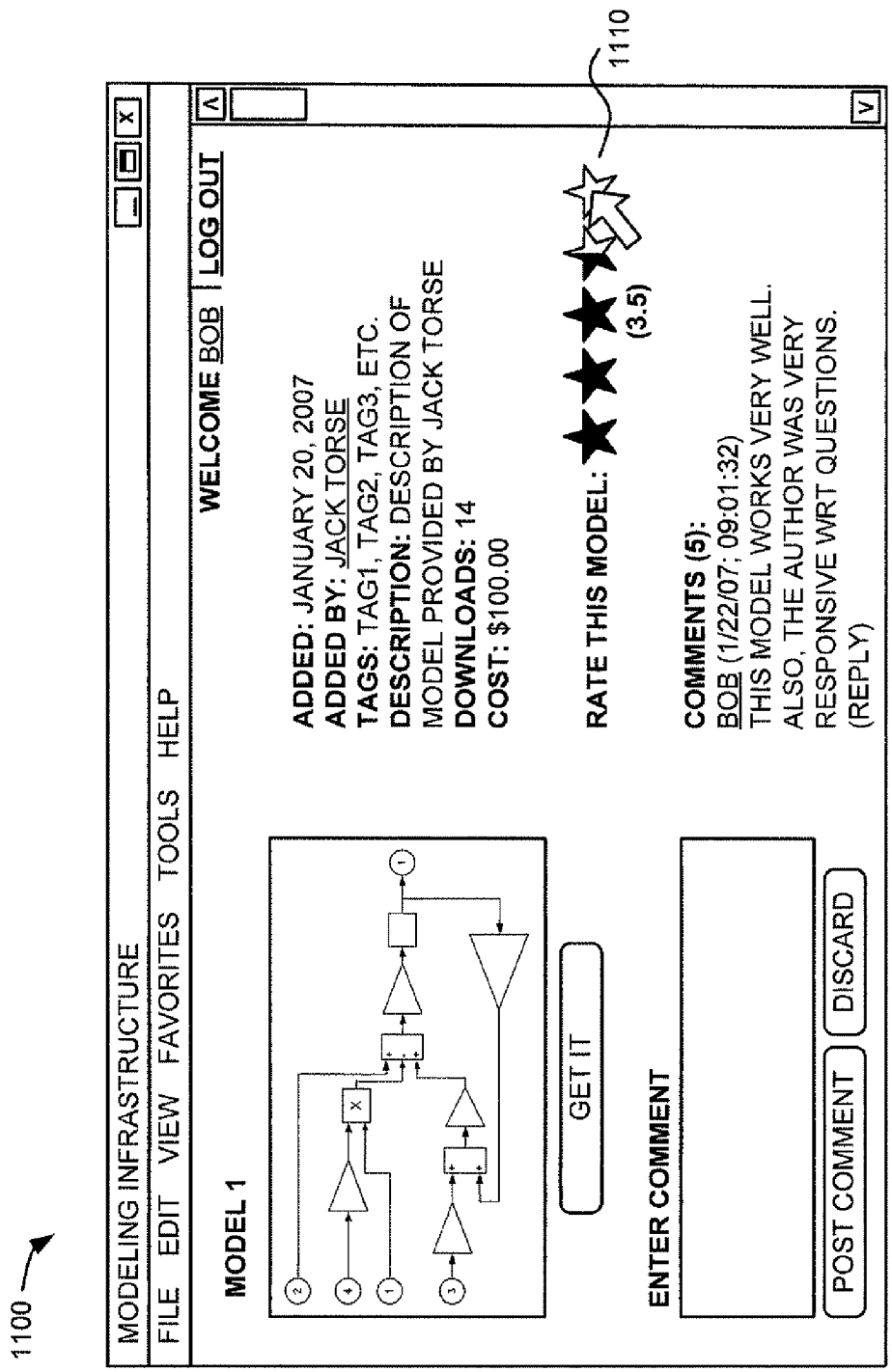
FIGS. 11A and 11B are exemplary documents that may be provided to allow a user to provide rating information for a model.

Processing may begin with modeling infrastructure 220 receiving rating information for a model (block 1010). Modeling infrastructure 220 may, for example, provide a document, such as document 1100 (FIG. 11A), to a user of a user device 210. Document 1100 may include an area 1110 that allows the user to rate the model being displayed in document 1100. The user may, for example, click on one of the stars to rate the model. Other techniques for rating a model may alternatively be used. Assume, as illustrated in FIG. 11A, that the user clicks on the right-most star (giving the model a rating of five stars). In some embodiments, modeling infrastructure 220 may request that the user log in to modeling infrastructure 220 by, for example, providing a user identifier and possibly a password, before the user is allowed to rate a model.

Returning to the process of FIG. 10, modeling infrastructure 220 may determine a rating for the model using the received rating information (block 1020). For example, modeling infrastructure 220 may take the average of all of the ratings received for the model. Other techniques for determining a rating may alternatively be used. For example, modeling infrastructure 220 may take the mean and its variance of all of the ratings received for the model, the maximum and minimum of all of the ratings received for the model, etc.

Figure 11B:
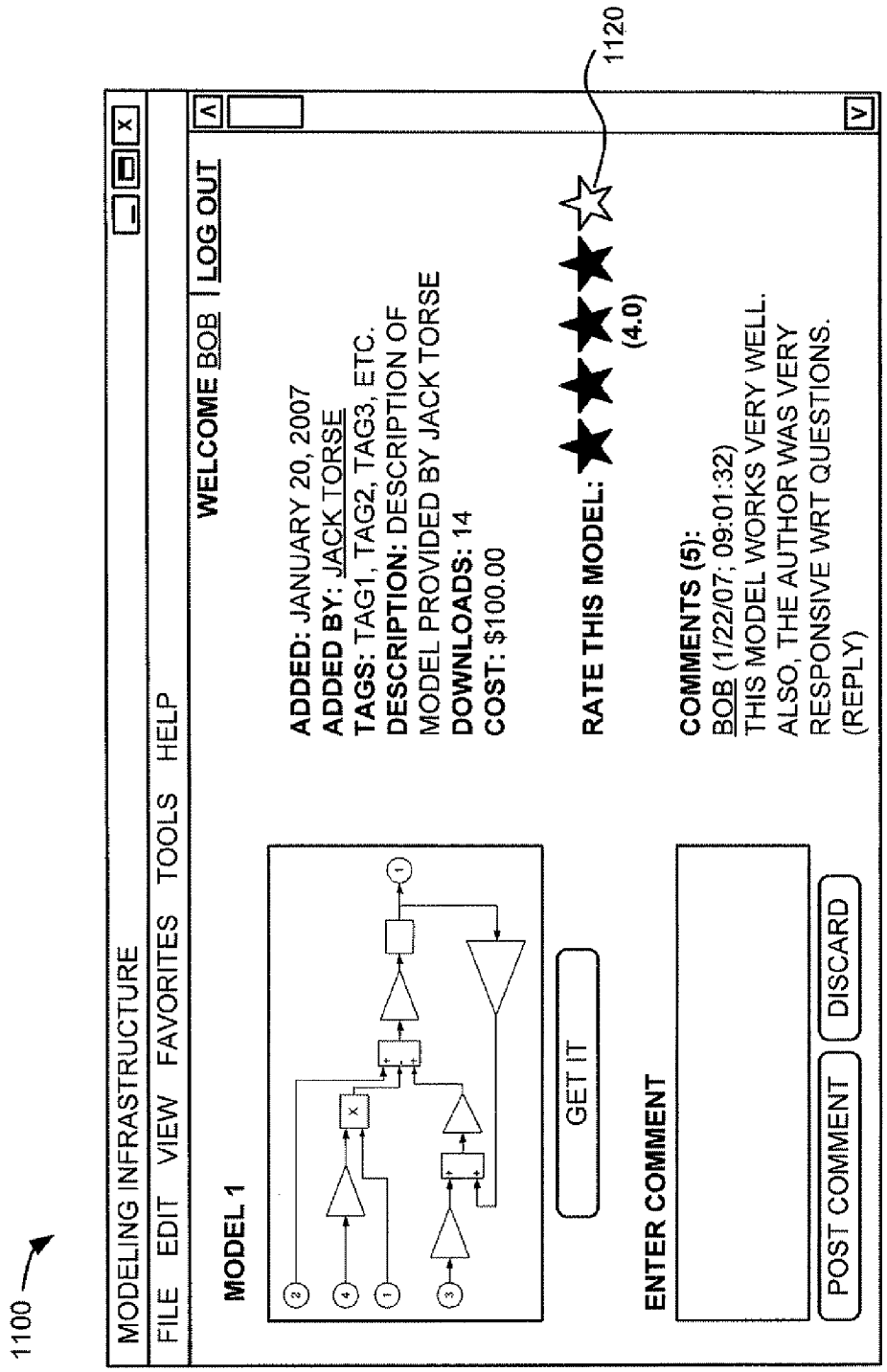

Modeling infrastructure 220 may associate the determined rating with the model (block 1030). For example, modeling infrastructure 220 may store the determined rating in database 460. Thereafter, if a document is provided that includes the model, a new rating 1120 may be displayed, as illustrated in FIG. 11B.

FIG. 12 is a flowchart of an exemplary process for obtaining a model. The processing of FIG. 12 may be performed by one or more software and/or hardware components within modeling infrastructure 220. Alternatively, the processing may be performed by one or more software and/or hardware components within another device or a group of devices separate from or including modeling infrastructure 220.

Figure 13A:
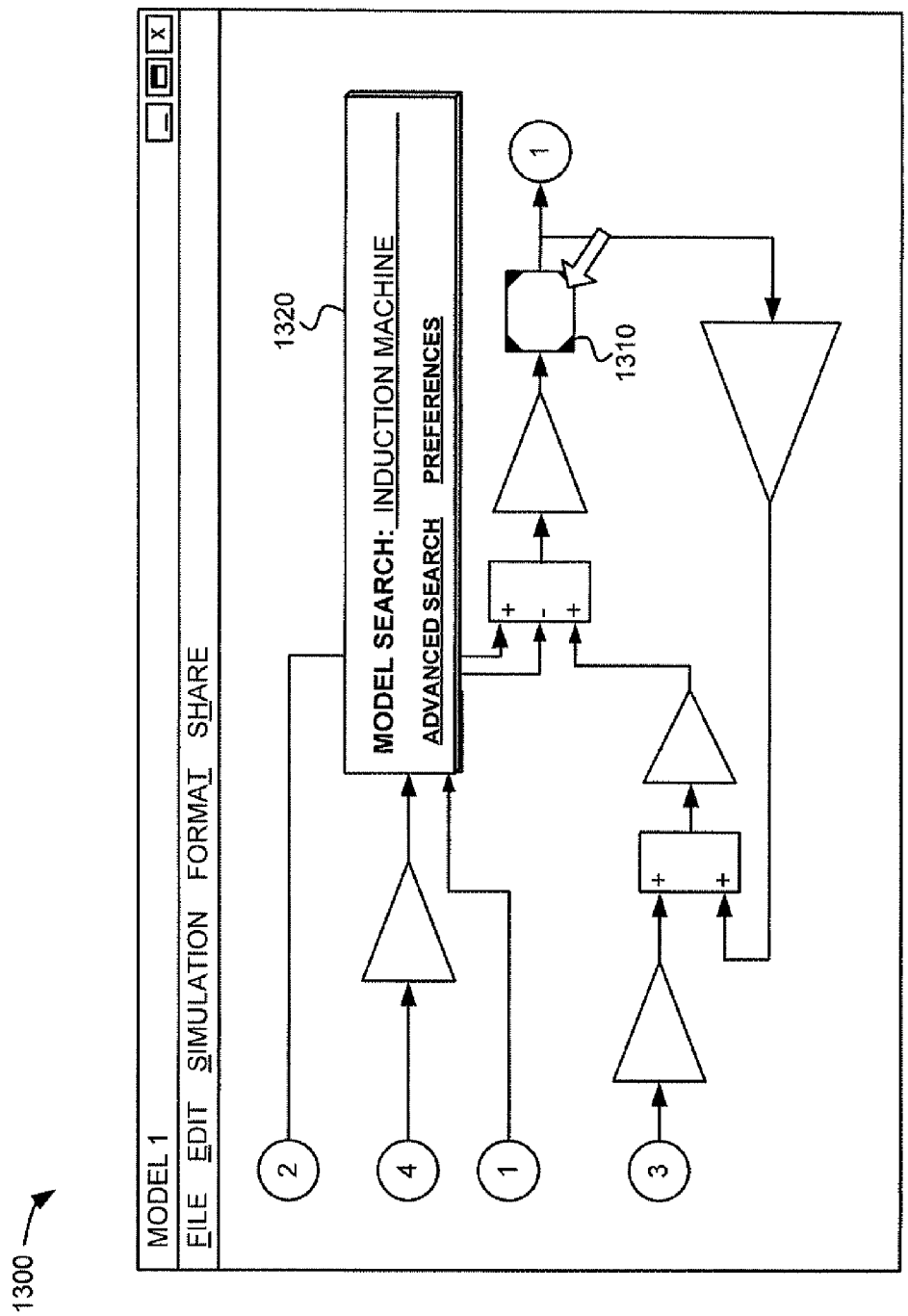

Processing may begin with modeling infrastructure 220 receiving a search query from a user of a user device 210 (block 1210). Assume, as illustrated in FIG. 13A, that a user is in the process of creating a model using a model creation environment document 1300. The user may insert an element 1310 into the model where the user wants to insert another model into the model being created. By selecting element 1310, a search dialog box 1320 may be presented to the user. The user may enter a search query into search dialog box 1320 to cause user device 210 to transmit the search query to modeling infrastructure 220. Search dialog box 1320 may be associated with an advanced search feature and a preferences feature, as will be described in further detail below. The user may cause search dialog box 1320 to appear in other ways. For example, model creation environment 1300 may provide a menu item that, if selected, causes search dialog box 1320 to appear.

Figure 13B:
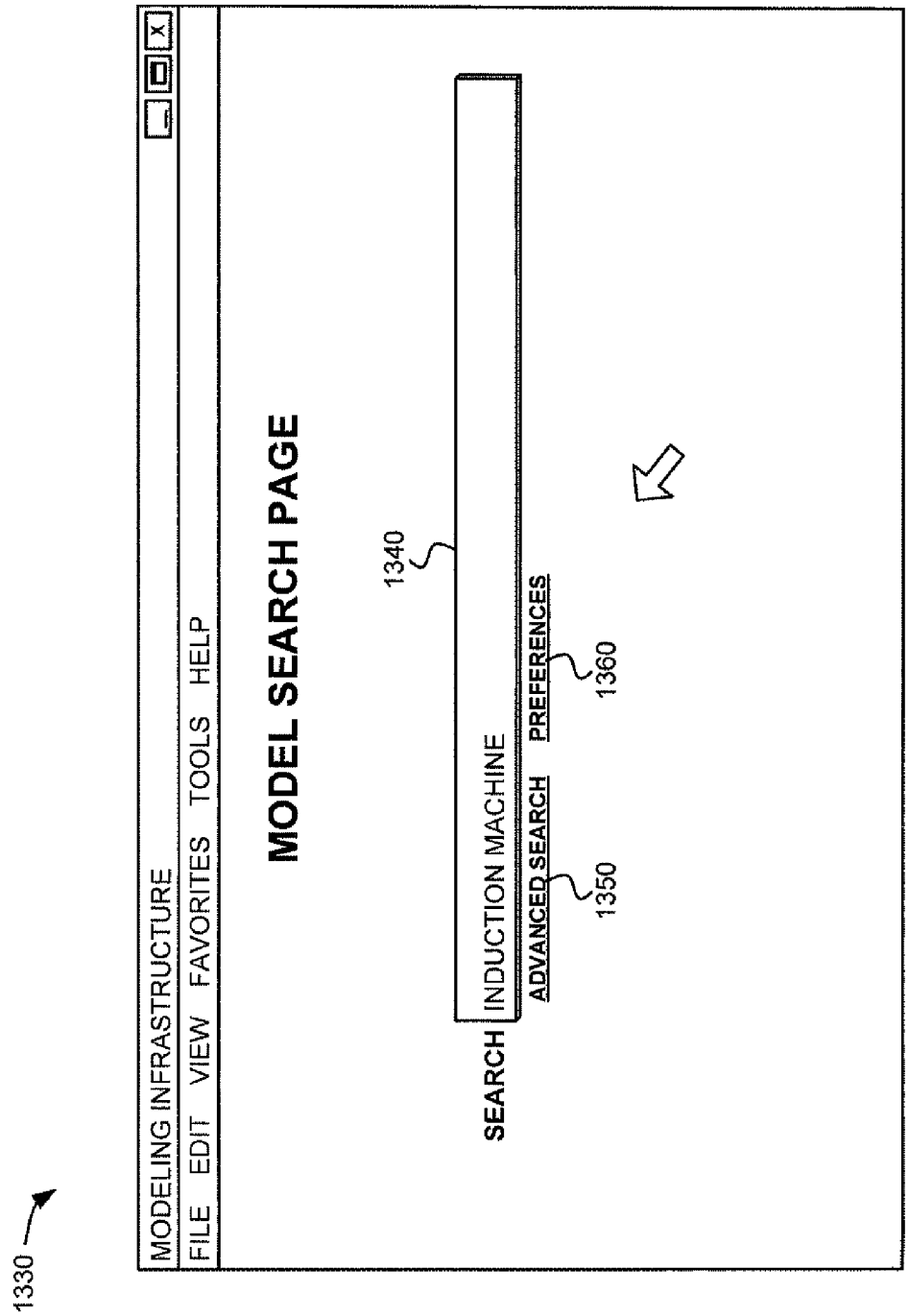

As an alternative to accessing a search dialog box via a model creation environment, the user may connect to modeling infrastructure 220 (or another device) to access a search dialog box. For example, assume, as illustrated in FIG. 13B, a user connects to modeling infrastructure 220 and requests a document 1330 that allows the user to search for a model of interest. As illustrated in FIG. 13B, document 1330 may include a search dialog box 1340, an advanced search feature 1350, and a preferences feature 1360. Search dialog box 1340 may allow the user to enter a search query for a model and transmit the search query to modeling infrastructure 220 for processing. If advanced search feature 1350 is selected (e.g., by clicking on it), modeling infrastructure 220 may provide a document 1370, as illustrated in FIG. 13C. Document 1370 may allow the user to specify criteria for performing a current search for a model. For example, document 1370 may allow the user to specify one or more sequences of characters that may appear in a title associated with a model, one or more sequences of characters that may appear in a user description of a model, a level of complexity for a model, the number of input ports contained in the model and/or a range for the number of input ports in the model (e.g., less than 10, between 5 and 10, more than 5, etc.), the number of output ports contained in the model and/or a range for the number of output ports in the model (e.g., less than 10, between 5 and 10, more than 5, etc.), characteristics of the input ports and/or output ports (such as data type, sample rate, etc.), a date or date range when the model was added to modeling infrastructure 220, an author of a model associated with modeling infrastructure 220, a location or group of locations (e.g., one or more web sites) where the model search is to be performed, rating information (such as "only provide models that have been rated as four stars or above"), whether the model uses continuous time integration or discrete time integration, whether the model is self-contained, the number of subsystems within the model, the identify of the software and/or the version of the software that was used to create the model, and/or other information.

Figure 13D:
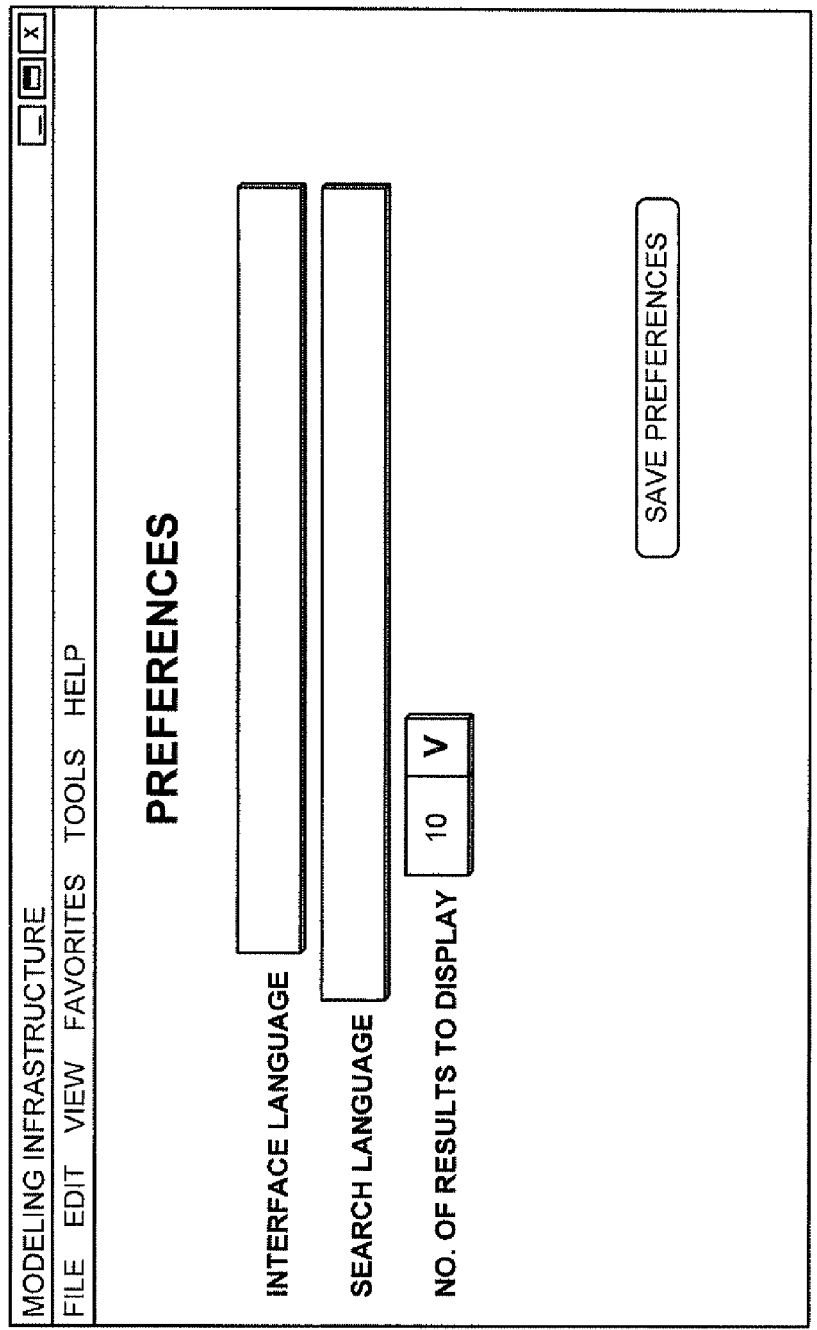

If preferences feature 1360 is selected (e.g., by clicking on it), modeling infrastructure 220 may provide a document 1380, as illustrated in FIG. 13D. Document 1380 may allow the user to specify criteria for performing searches for a model. For example, document 1380 may allow the user to specify a language in which document 1330 and other documents are to be presented to the user, the language in which the user is going to provide the search query, the number of results to display on a single page, and/or other information.

Returning to the process of FIG. 12, modeling infrastructure 220 may identify a list of models based on the received search query (block 1220). Modeling infrastructure 220 may use any well known searching technique to identify the list of models. The searching technique may involve acts that are different than merely filtering a list of models based, for example, on a name. For example, modeling infrastructure may match the one or more sequences of characters in the search query to the data associated with the models (e.g., tags or other information). Modeling infrastructure 220 may also rank the models in the list based, for example, on how closely the models match the one or more sequences of characters in the search query (or on other criteria).

Figure 14:
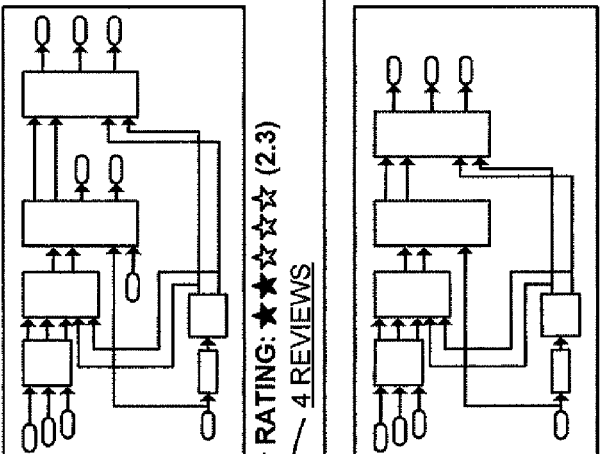
FIG. 14 is an exemplary document that may be provided to a user in relation to obtaining a model.

Modeling infrastructure 220 may provide the list of models to the user (block 1230). For example, modeling infrastructure 220 may cause a document, such as document 1400 illustrated in FIG. 14, which contains the list of models, to be provided to the user. As illustrated in FIG. 14, document 1400 may include an image section 1410, a title section 1420, a description section 1430, a tags section 1440, an author section 1450, a downloads section 1460, a cost section 1470, a rating section 1480, and a reviews section 1490.

Image section 1410 may include a snapshot of the model (e.g., a high level block diagram or other image of the model). Alternatively, image section 1410 may include another image related or unrelated to the model (e.g., an image of the author of the model, an image selected by the author or another source, etc.). In one embodiment, document 1400 may allow the user to execute a portion of the model by, for example, clicking on the snapshot in image section 1410. Title section 1420 may include a title associated with the model. Description section 1430 may include a description (or a portion of the description) that was provided by the author of the model. In other instances, description section 1430 may include a description (or a portion of the description) provided by another source (e.g., an administrator associated with modeling infrastructure 220). Tags section 1440 may include a list of one or more of the tags associated with the model. Author section 1450 may include a name (or identifier) of the author of the model. In one embodiment, selection of the author's name may cause further information about the user to be provided, such as background information and/or contact information for the author. In another embodiment, selection of the author's name may cause an instant messenger or e-mail program to be launched to allow the user to transmit a question or comment to the author. In yet another embodiment, the authors may be notified by modeling infrastructure 220 upon occurrence of some events, such as, for example, that one of the models of their creation has been downloaded. Downloads section 1460 may provide information regarding the number of times that users have downloaded (or obtained) the model. Cost section 1470 may including information indicating how much it costs to download (or obtain) the model. The models may cost a certain amount of money or may be free. In some embodiments, the models may be auctioned off to the highest bidder or immediately sold to a bidder who offers a minimum amount. Rating section 1480 may indicate a rating associated with the model. Reviews section 1490 may provide an indication of how many users have reviewed the model. In one embodiment, selection of the number of reviews may cause a document to be provided to the user that includes all or a portion of the reviews for the model. In one embodiment, some or all of the reviews may be selectively accessible to the user (e.g., based on user privileges, a date stamp, etc.).

It will be appreciated that document 1400 may include additional information or other information than illustrated in FIG. 14. For example, document 1400 may provide an indication of quality for a model in document 1400 in a number of categories. The categories may include cyclomatic complexity of the model, the number of semantic and/or syntax errors in the model, the number of potential problems with the model, the amount of help files associated with the model, the number of issues that exist with respect to file naming, the amount of duplicate functionality or code included in the model, and/or other categories. Moreover, document 1400 may also provide an indication as to how the model compares to other models in the above categories and/or other categories.

Figure 15:
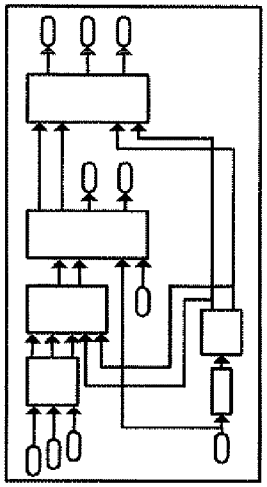
FIG. 15 is an exemplary document that may be provided to a user in relation to obtaining a model.

Returning to the process of FIG. 12, modeling infrastructure 220 may detect selection of one of the models provided in the list of models (block 1240). For example, the user may select a model by, for example, clicking on the image in image section 1410, the title in title section 1420, or another portion of document 1400. In response to detecting selection of a model, modeling infrastructure 220 may provide additional details regarding the model (block 1250). For example, modeling infrastructure 220 may provide a document, such as document 1500 illustrated in FIG. 15. In addition to the model information provided in document 1400, document 1500 may provide a full description of the model provided by the user (or another user), reviews of the model, a larger number of tags associated with the model, etc. Document 1500 may also include a button 1510 (or other element) that allows the user to obtain the model.

Returning to the process of FIG. 12, modeling infrastructure 220 may receive a request for the model (block 1260). For example, assume that the user selects GET IT button 1510 in document 1500. In response, the user's user device 210 may transmit a request for the model to modeling infrastructure 220.

In those situations where the requested model is associated with a fee, the user may be requested to pay the fee prior to obtaining the model. The payment of the fee could be handled between the two parties directly (i.e., between the author of the model and the user purchasing the model) or may involve a third-party mediator.

Modeling infrastructure 220 may provide the model to the user in response to the request (block 1270). In some embodiments, modeling infrastructure 220 may request that the user log in to modeling infrastructure 220 (e.g., by providing a user identifier and possibly a password to modeling infrastructure 220) prior to providing a model. In those situations where the model is shared remotely (e.g., stored in modeling infrastructure 220), modeling infrastructure 220 may allow the user to download the model or connect to the model via, for example, a Transmission Control Protocol (TCP)/Internet Protocol (IP) connection or other type of connection. In those situations where the model is shared locally by the author, modeling infrastructure 220 may provide instructions (or a link) for downloading the model from the author's user device 210 or connecting to the model via, for example, a TCP/IP connection or other type of connection. In either situation, the obtained model may be manually or automatically inserted into the element (e.g., element 1310 in FIG. 13A) in the model that the user is creating. In this way, a user may easily search for and obtain models of interest.

Transferring the requested model to the user (e.g., for inclusion in another model being created by the user) may allow the model or part of the model to undergo some initial processing. For example, if the actual content of the model is available (rather than only an interface that allows communication of numerical data, such as in co-simulation), inherited characteristics of the model can be supported. For example, the model (or part of the model) can inherit the sample rate from where the model is used. Since access to the model's internals is available, the sample rate of the context where the model is used can be used to establish the sample rates of elements in the received model. This may be accomplished by propagating the sample rate into the model (or part of the model). Also, optimizations may be applied to the model or model part. Moreover, since access to the model's internals is available, the internals can be, for example, reduced in complexity while maintaining functionality. This reduction in complexity can be performed locally (i.e., within the model (or model part)), but also based on the context in which the model (or model part) is used. For example, if the context in which the model (or model part) is used is known, some of the functionality of the model (or model part) may be removed or the model (or model part) may be executed differently to obtain an overall more efficient execution. In some embodiments, the model (or model part) may be processed to obtain a more complex or simplified version. For example, nonlinear blocks within the model (or model part) may be replaced by their linear approximation within a given tolerance that may be user-provided.

In some embodiments, once the obtained model is inserted into the element (e.g., element 1310 in FIG. 13A) or the reference to the model is obtained, information, available through modeling infrastructure 220, regarding the obtained model may be displayed in the model creation environment. For example, in one embodiment, a rating of the model (as determined by modeling infrastructure 220) may be displayed on element 1310. The rating may be represented by stars, numbers, or in another manner. The displayed rating may be dynamically updated as modeling infrastructure 220 changes the rating for the obtained model. As an example, a user may obtain a model that, at the time of obtaining the model, is rated as 4 stars. Assume that over time, the rating of the model decreases to 1 star. This decreased rating may be reflected in the modeling creation environment to the user who obtained the model. Thus, the user may decide, in this situation, to obtain another model due to the low rating that the model has achieved. In an alternative embodiment, the rating will continue to reflect the rating at the time when the user has initially obtained the model. In yet another embodiment, the rating may reflect both the initial rating and/or the updated rating and the user's own rating. The proportional significance of each of those parameters may be different in different embodiments.

Figure 16A:
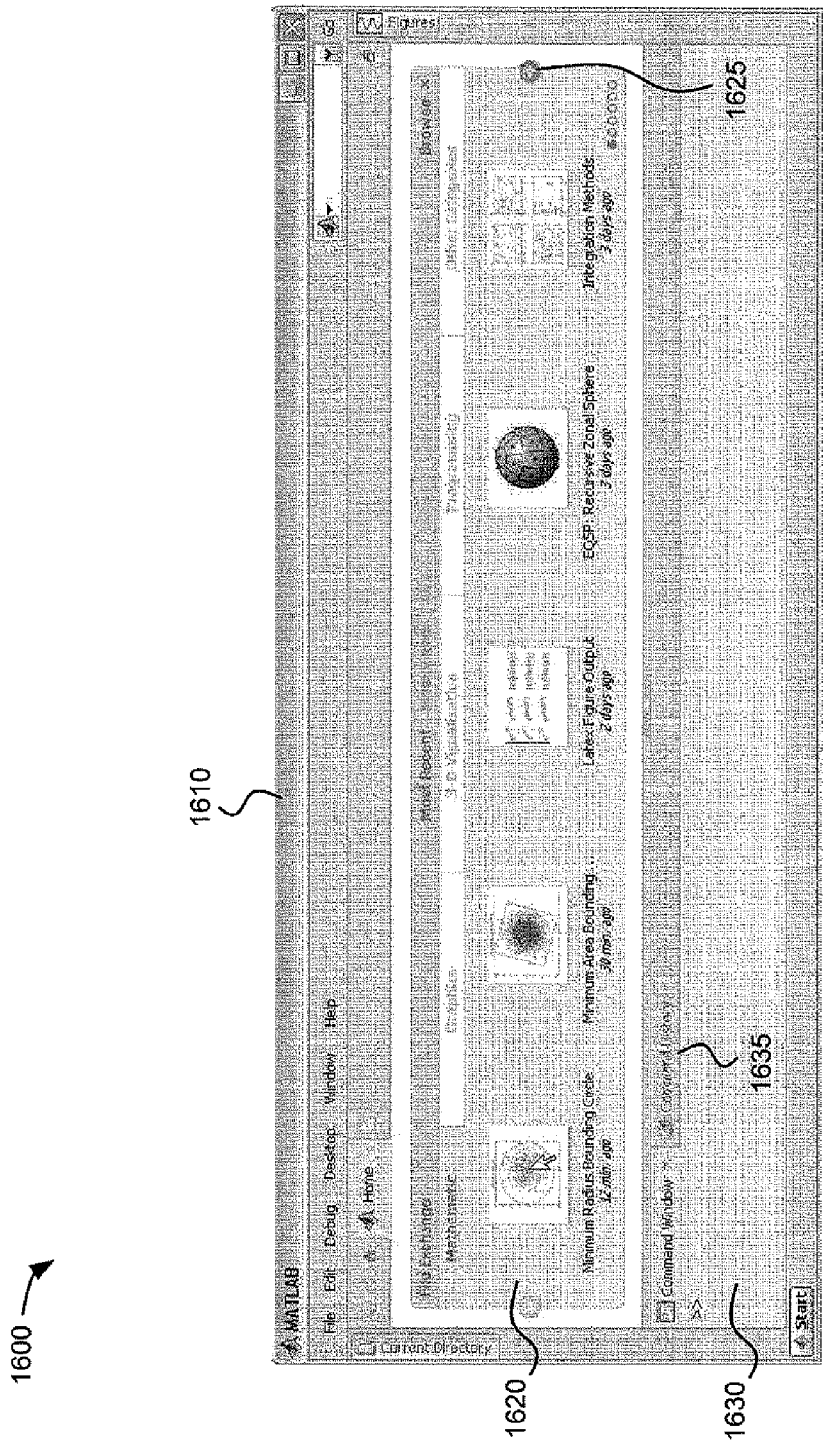
FIGS. 16A and 16B illustrate how models in a model repository may be accessed from a model creation environment.
Figure 16B:
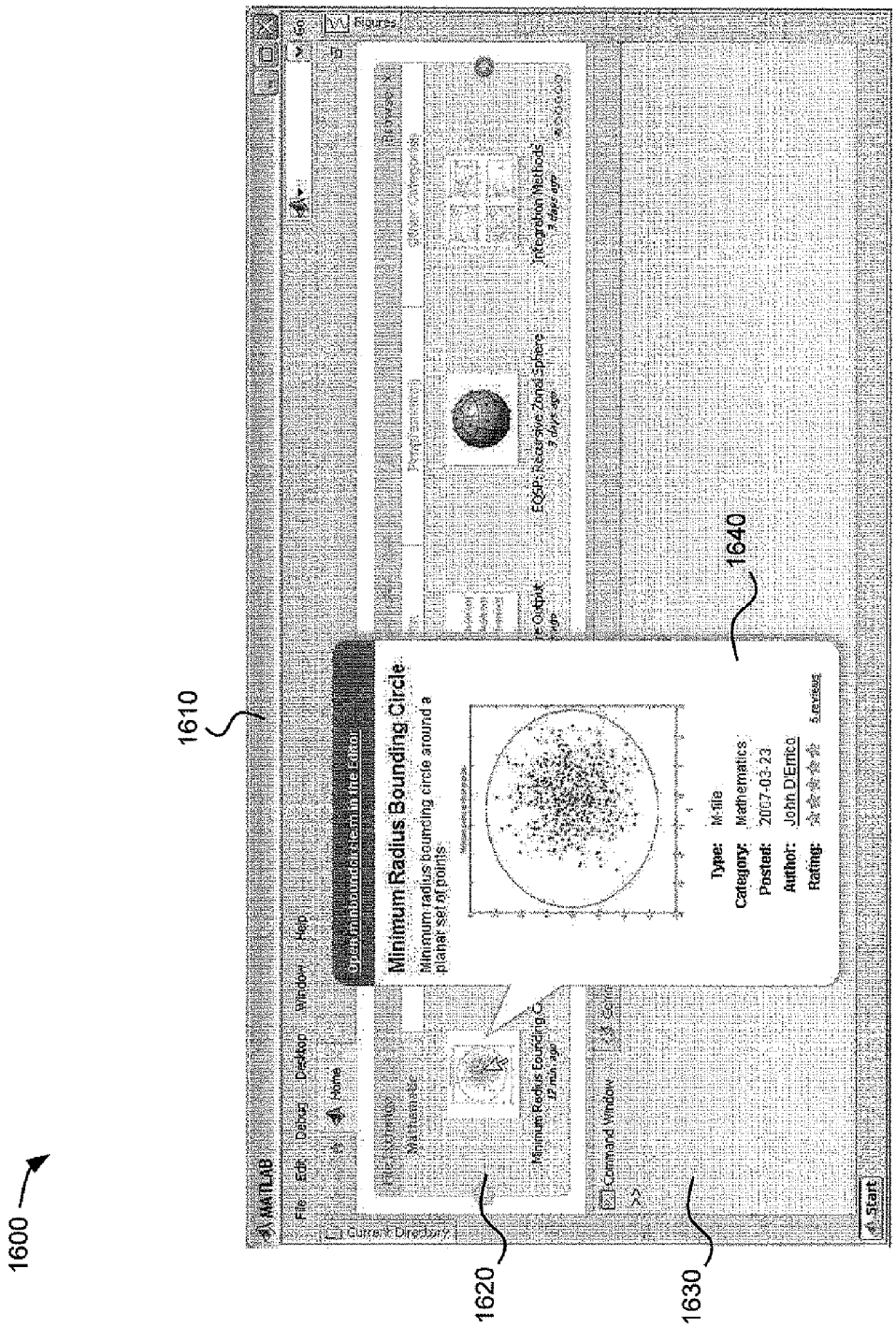

The following example 1600 set forth in FIGS. 16A and 16B illustrates how models in a model repository (e.g., models associated with modeling infrastructure 220) (or models stored on a network, such as the Internet) may be accessed from a model creation environment. In example 1600, the model creation environment may be used to design textual models. As illustrated in FIG. 16A, user interface 1610 may include two main interface windows: a main window 1620 and a command window 1630.

Main window 1620 provides a user with the ability to access models associated with modeling infrastructure 220. In example 1600, the model repository is marked "Home" and alternate repositories may be accessible. Each repository may be associated, for example, with a separate tab in main window 1620. Models may be grouped into categories in each repository. The models illustrated in main window 1620 are in a "Mathematic" category and may include, for example, minimum radius and minimum area based computations, Latex figure output, recursive sphere computations, and integration methods. Additional models may be displayed by selecting arrow 1625 on the right-hand side of main window 1620. Other categories that may be selected may include, for example, a graphics category, a visualization category, a programming category, and an "other categories" category. The models can be presented in main window 1620 based on their time of creation, when the models were made available (e.g., most recent first), or their ratings (e.g., based on how high the ratings are, how often they have been rated, etc.), and/or on other information.

Command window 1630 may allow users to enter commands (e.g., at the ">>" prompt). The history of commands can be accessed by activating a Command History tab 1635.

An additional details window 1640 that provides information regarding a model in command window 1620 may be provided to the user, as illustrated in FIG. 16B, in response to a user selecting the model (e.g., in response to a mouse over, mouse click, tab event, or shortcut keyboard event). As illustrated, additional details window 1640 may include the title of the model, an abstract to summarize an intent or content of the model, one or more graphics (e.g., to display characteristic output of the model), the type of the model, the category to which the model belongs, when the model was made available (or published), information identifying an author or authors of the model, and a rating for the model (e.g., based on a history of ratings). Furthermore, additional details window 1640 may also include reviews in their complete or partial form and/or a link to more reviews or more details of reviews. In example 1600, additional details window 1640 includes a link to open a document with the 5 reviews that the model has received. Additional details window 1640 may include additional information, such as the number of inputs associated with the model, the number of outputs associated with the model, the data types of inputs and outputs, the complexity, sample rates, dimensions, cyclomatic complexity, the number of model elements of a certain type, such as, e.g., lines of code, etc.

Conclusion

Systems and methods described herein may provide a modeling infrastructure that allows users to make models available to other users and to search for and obtain models of interest.

The foregoing description of exemplary embodiments provides illustration and description, but is not intended to be exhaustive or to limit the invention to the precise form disclosed. Modifications and variations are possible in light of the above teachings or may be acquired from practice of the invention. For example, in some embodiments, modeling infrastructure 220 may provide one or more application programming interfaces (APIs) that allow different model creation providers to integrate the use of modeling infrastructure 220 into their own model creation programs.

While the above description focused on modeling infrastructure 220 providing a modeling sharing environment, modeling infrastructure 220 may perform other functions. For example, modeling infrastructure 220 may automatically search for models in a network, such as the Internet, and may automatically attempt to execute any models that are found. If a model does not function properly (e.g., execution of the model fails, execution requires a large amount of resources, etc.), the model may be evaluated to determine if there is an issue with the model or with the software that is executing the model. For example, if the model is valid, there may be an issue with the software executing the model. In case of a valid model, modeling infrastructure 220 may execute the model using a previous version of the potentially problematic software. If the model functions properly using the previous version of software, the model may be flagged for later analysis as to why the previous version of software works, but the newer version of software does not work. For example, a comparison between the execution of the model using two different versions of the software may reveal an increase in memory usage, an increase in execution time, loading different shared libraries, etc. In this way, modeling infrastructure 220 may aid in software evaluation.

While series of acts have been described with regard to FIGS. 5, 8, 10, and 12, the order of the acts may be modified in other embodiments. Further, non-dependent acts may be performed in parallel.

It will be apparent that aspects, as described above, may be implemented in many different forms of software, firmware, and hardware in the embodiments illustrated in the figures. The actual software code or specialized control hardware used to implement aspects described herein is not limiting of the invention. Thus, the operation and behavior of the aspects were described without reference to the specific software code—it being understood that one would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   means for receiving a search query from a model creation environment;
   means for performing a search of a repository that includes a plurality of models to identify a list of models based on the search query;
   means providing the identified list of models;
   means for providing information for at least one model in the identified list of models, the at least one model is a computational model, the information including an author associated with the at least one model and a rating of the at least one model;
   means for receiving a request for the at least one model in the identified list of models;
   means for providing the at least one model to the model creation environment based on receiving the request; and
   means for inserting the at least one model into another computational model in the model creation environment.

2. An apparatus for searching for models, the apparatus comprising:
   processing logic coupled to an output device,
   wherein the processing logic is programmed to:
      receive a search query from a model creation environment;
      perform a search of a repository that includes a plurality of models to identify a list of models based on the search query;
      provide the identified list of models to the output device;
      provide information for at least one model in the identified list of models, the at least one model is a computational model, the information including an author associated with the at least one model and a rating of the at least one model;
      receive a request for the at least one model in the identified list of models;
      provide the at least one model to the model creation environment based on receiving the request; and
      insert the at least one model into another computational model in the model creation environment.

3. A non-transitory computer-readable storage medium that stores instructions executable by at least one processor for searching for models, the computer-readable storage device comprising:
   instructions for receiving a search query from a model creation environment;
   instructions for performing a search, of a repository that includes a plurality of models, to identify a list of models based on the search query, the identified list of models including at least one computational model;
   instructions for providing the identified list of models;
   instructions for providing information for the at least one computational model in the identified list of models, the information including a rating of the at least one computational model, the information for the at least one computational model being provided within the model creation environment;
   instructions for receiving a request for the at least one computational model in the identified list of models; and
   instructions for providing the at least one computational model to the model creation environment based on receiving the request.

4. The non-transitory computer-readable medium of claim 3 further comprising:
   instructions for associating one or more tags with the plurality of models; and
   instructions for comparing the search query to the one or more tags.

5. The non-transitory computer-readable medium of claim 3 further comprising:
   instructions for inserting the at least one computational model into another computational model in the model creation environment.

6. The non-transitory computer-readable medium of claim 3 wherein the search query includes at least one search criterion, and the at least one search criterion is selected from the group consisting of:
   a level of complexity for a desired model,
   a number of warnings that an editing style is violated with respect to the desired model,
   a number or range of numbers of input ports contained in the desired model,
   a number or range of numbers of output ports contained in the desired model,
   a date or date range when the desired model was made available,
   an author of the desired model,
   a location or group of locations where a search using the search query is to be performed,
   rating information for the desired model,
   whether the desired model uses continuous time integration or discrete time integration,
   whether the desired model is self-contained,
   a number of subsystems within the desired model,
   information identifying one or more modeling standards to which the desired model adheres,
   information identifying a product or products on which the desired model relies,
   annotations added to the desired model, and
   a version of software that was used to create the desired model.

7. A non-transitory computer-readable storage medium that stores instructions executable by at least one processor for searching for models, the computer-readable storage device comprising:
   instructions for receiving a search query from a model creation environment;
   instructions for performing a search, of a repository that includes a plurality of models, to identify a list of models based on the search query, the identified list of models including at least one computational model;
   instructions for providing the identified list of models;

instructions for providing information for the at least one computational model in the identified list of models, the information selected from the group consisting of a rating of the at least one computational model, a size of the at least one computational model, and a version of the at least one computational model, the information for the at least one computational model being provided within the model creation environment;

instructions for receiving a request for the at least one computational model in the identified list of models; and instructions for providing the at least one computational model to the model creation environment based on receiving the request.

8. The non-transitory computer-readable medium of claim 7 further comprising:
instructions for associating one or more tags with the plurality of models; and
instructions for comparing the search query to the one or more tags.

9. The non-transitory computer-readable medium of claim 7 further comprising:
instructions for inserting the at least one computational model into another computational model in the model creation environment.

10. The non-transitory computer-readable medium of claim 7 wherein the search query includes at least one search criterion, and the at least one search criterion is selected from the group consisting of:
a level of complexity for a desired model,
a number of warnings that an editing style is violated with respect to the desired model,
a number or range of numbers of input ports contained in the desired model,
a number or range of numbers of output ports contained in the desired model,
a date or date range when the desired model was made available,
an author of the desired model,
a location or group of locations where a search using the search query is to be performed,
rating information for the desired model,
whether the desired model uses continuous time integration or discrete time integration,
whether the desired model is self-contained,
a number of subsystems within the desired model,
information identifying one or more modeling standards to which the desired model adheres,
information identifying a product or products on which the desired model relies,
annotations added to the desired model, and
a version of software that was used to create the desired model.

11. A non-transitory computer-readable storage device that stores instructions executable by at least one processor for searching for models, the computer-readable storage device comprising:
instructions for receiving a search query from a model creation environment;
instructions for performing a search, of a repository that includes a plurality of models, to identify a list of models based on the search query, the identified list of models including at least one computational model;
instructions for providing the identified list of models;
instructions for providing first information for the at least one computational model in the identified list of models, the first information selected from the group consisting of:
an author of the at least one computational model,
a rating of the at least one computational model,
a size of the at least one computational model, and
a version of the at least one computational model;
instructions for receiving a selection of the at least one computational model in the identified list of models; and
instructions for providing second information for the at least one computational model in the identified list of models, the second information selected from the group consisting of:
one or more reviews of the at least one computational model,
an indication of a quality of the at least one computational model, and
one or more tags associated with the at least one computational model.

12. The non-transitory computer-readable storage device of claim 11 wherein the indication of a quality is selected from the group consisting of:
a cyclomatic complexity of the at least one computational model,
a number of semantic errors in the at least one computational model,
a number of syntax errors in the at least one computational model,
a number of potential problems with the at least one computational model,
an amount of help files associated with the at least one computational model,
a number of issues that exist with respect to file naming or an amount of duplicate functionality included in the at least one computational model, and
an indication as to how the at least one computational model compares to one or more other models.

13. The non-transitory computer-readable storage device of claim 11 wherein the selection is received from a user input device.

14. The non-transitory computer-readable storage device of claim 11 wherein the user input device is selected from the group consisting of a keyboard, a mouse, a pen, and a voice recognition unit.

15. A non-transitory computer-readable storage device that stores instructions executable by at least one processor for searching for models, the computer-readable storage device comprising:
instructions for receiving a search query from a model creation environment;
instructions for performing a search, of a distributed repository storing a plurality of models, to identify a list of models based on the search query, the identified list of models including at least one computational model, the distributed repository distributed across a plurality of server entities;
instructions for providing the identified list of models;
instructions for providing information for the at least one computational model in the identified list of models, the information selected from the group consisting of an author of the at least one computational model, a rating of the at least one computational model, a size of the at least one computational model, and a version of the at least one computational model, the information for the at least one computational model being provided within the model creation environment;
instructions for receiving a request for the at least one computational model in the identified list of models; and
instructions for providing the at least one computational model to the model creation environment based on receiving the request.

* * * * *